US012790865B2

(12) United States Patent
Aurand et al.

(10) Patent No.: US 12,790,865 B2
(45) Date of Patent: Nov. 10, 2026

(54) DOCK DOOR ASSEMBLY

(71) Applicant: Raynor Mfg. Co., Dixon, IL (US)

(72) Inventors: Keith Aurand, Dixon, IL (US); Gary A. Wedekind, Dixon, IL (US); Chris Cone, Dixon, IL (US); Alec Lay, Grand Detour, IL (US)

(73) Assignee: Raynor Mfg. Co., Dixon, IL (US)

( * ) Notice: Subject to any disclaimer, the term of this patent is extended or adjusted under 35 U.S.C. 154(b) by 516 days.

(21) Appl. No.: 18/119,550

(22) Filed: Mar. 9, 2023

(65) Prior Publication Data

US 2023/0323730 A1 Oct. 12, 2023

Related U.S. Application Data

(60) Provisional application No. 63/322,497, filed on Mar. 22, 2022.

(51) Int. Cl.

| | |
|---|---|
| ***E05D 13/00*** | (2006.01) |
| ***E05C 1/00*** | (2006.01) |
| ***E05C 1/04*** | (2006.01) |
| ***E05D 15/16*** | (2006.01) |

(52) U.S. Cl.

CPC .......... *E05D 13/1261* (2013.01); *E05C 1/004* (2013.01); *E05C 1/04* (2013.01); *E05D 15/165* (2013.01); *E05Y 2201/484* (2013.01); *E05Y 2201/654* (2013.01); *E05Y 2201/664* (2013.01); *E05Y 2201/684* (2013.01); *E05Y 2800/40* (2013.01); *E05Y 2900/106* (2013.01)

(58) Field of Classification Search

CPC ....... E05F 15/686; E05F 15/688; E05F 15/16; E05F 15/24; E05F 13/1261; E05Y 2900/106; E06B 9/581; E06B 2009/005; E06B 2009/135; E06B 3/44; E06B 3/4407

See application file for complete search history.

(56) References Cited

U.S. PATENT DOCUMENTS

| | | | | |
|---|---|---|---|---|
| 2,083,467 A * | 6/1937 | Morris | E05F 15/686 | 160/189 |
| 5,657,805 A * | 8/1997 | Magro | E06B 9/581 | 160/133 |
| 5,964,268 A * | 10/1999 | Carper | E05D 13/1215 | 16/DIG. 7 |

(Continued)

OTHER PUBLICATIONS

Doco Low Level with vertical lift (Year: 2021).*

*Primary Examiner* — Abe Massad
(74) *Attorney, Agent, or Firm* — Banner & Witcoff, Ltd.

(57) ABSTRACT

A dock door assembly and a dock door assembly kit are provided for use in a dock door opening for installation in a warehouse. The dock door assembly comprises a pair of vertical tracks, with each vertical track configured to be attached to a wall along opposing lateral sides of the dock door opening. The dock door assembly also comprises a multiple, horizontal section door characterized by a vertical height when closed and mounted on the pair of vertical tracks. The dock door assembly further comprises a spring shaft assembly and a pair of headplates with each headplate having a U-shaped opening to receive each end of a torsion shaft. Further, the dock door assembly may comprise a pair of door cables and a pair of corner cable attachments connecting each door cable to the spring shaft assembly.

20 Claims, 25 Drawing Sheets

(56) References Cited

U.S. PATENT DOCUMENTS

| | | | | | |
|---|---|---|---|---|---|
| 6,042,158 | A * | 3/2000 | Horn | E05D 13/006 | 292/DIG. 36 |
| 6,065,525 | A * | 5/2000 | Wells | E06B 9/58 | 160/273.1 |
| 6,742,564 | B2 * | 6/2004 | Martin | E05D 15/246 | 160/188 |
| 7,464,743 | B1 * | 12/2008 | Berger, Jr. | E06B 9/581 | 160/133 |

* cited by examiner

DOCK DOOR ASSEMBLY

CROSS REFERENCE TO RELATED APPLICATION

The present application claims priority to U.S. Application No. 63/322,497 filed on Mar. 22, 2022, which is hereby incorporated fully by reference for any non-limiting purposes.

TECHNICAL FIELD

In a principal aspect the present invention relates to a dock door assembly and method of assembly for a multi-section dock door assembly and commercial sectional doors for warehouses and other types of buildings.

BACKGROUND

Various types of buildings, such as warehouses with docks may include openings with doors for ingress and egress comprised of multiple, horizontal sections joined together by hinges and mounted on tracks to guide the articulating door sections between a closed position and an open position.

Warehouses and warehousing storage continue to grow with both new and retrofit requirements. With today's fast paced shipping world with next day and 2-day deliveries, there is a continued need for more warehouses and more dock doors. Garage door service providers are looking for faster and more cost effective ways to install dock doors. Dock door installation comes at a price, such as time and money. An ideal dock door installation method would include minimal trips to the dock door opening and minimal parts to save installation time and money.

SUMMARY

Briefly, the present invention comprises a unique and novel dock door assembly and method of assembly for a multi-sections dock door assembly and commercial sectional doors for warehouses and other types of buildings.

In a first aspect, a dock door assembly for use in a dock door opening in a warehouse may comprise a pair of tracks; a multiple, horizontal section door; a spring shaft assembly; a pair of headplates; and a pair of door cables and a pair of corner cable attachments. The pair of tracks may include each track configured to be attached to a wall along opposing lateral sides of the dock door opening. Each track may comprise a vertical roller track and a clip angle wall plate to attach each vertical roller track to the wall. The multiple, horizontal section door may be characterized by a vertical height when closed and mounted on the pair of tracks. The door may be moveable on the vertical roller tracks between an open and a substantially vertical closed position. The door may include a plurality of horizontal sections. The spring shaft assembly may be located adjacent and above a top of the door opening at approximately 16-½ inches above header height. The spring shaft assembly may include a torsion shaft, a pair of cable drums with each cable drum located near an end of the torsion shaft, at least one counterbalance torsion spring extending along the torsion shaft, and at least one torque bracket. The pair of headplates may include one headplate fastened to each of the clip angle wall plates and vertical track. Each headplate may be located at the opposing lateral sides of the door opening. The headplate may have a U-shaped opening to receive each end of the torsion shaft. The pair of door cables and the pair of corner cable attachments may connect each door cable to each of the cable drums. The door cable may have a first end attached to the cable drum and a second end attached to the corner cable attachment. The corner cable attachment may be located on an interior of the dock door and on a lowermost horizontal section of the dock door.

In other embodiments, the door dock assembly may further include a section cleat that includes a wind lock feature that comprises a wall cleat and a door cleat. The wall cleat and the door cleat may cooperatively engage and secure the dock door for windload resistance. The wall cleat may be attached to the clip angle wall plate and the door cleat may be attached to two of the horizontal sections. The wall cleat may comprise a wall cleat extension arm that extends from a wall cleat support plate attached to the clip angle wall plate. The door cleat may comprise a door cleat extension arm that extends from the door cleat support plate attached to two of the horizontal sections. The wall cleat extension arm and the door cleat extension arm may cooperate and engage with each other to keep the dock door secure for windload resistance.

In other embodiments, the dock door assembly may further include an interior lock that comprises a slide bar attached to one of the horizontal sections. The slide bar may slide between an extended position and a compressed position. When the slide bar is in the compressed position, the slide bar may engage with a strike plate attached to the vertical track and locks the dock door in a closed position. When the slide bar is in the extended position, the slide bar may be disengaged with the strike plate and the dock door is unlocked. The slide bar may be approximately 9 inches long.

Additionally, in other embodiments, two of the plurality of horizontal sections may be fastened together by a section center plate and two section end cleats using one or more fasteners, such as four fasteners. Further, each of the headplates may extend perpendicular to the wall. The U-shaped opening may be angled upward to ensure the torsion shaft sets into the opening and remains in the opening, thereby allowing the spring shaft assembly to be front loaded and front mounted on the headplate and the pair of tracks and wall. The upward angled U-shaped opening may allow the spring shaft assembly to rest in place while the spring shaft assembly is being bolted to the headplate.

Further, in other embodiments, the dock door assembly may comprise one or more outboard shaft support plates mounted to the wall to support the spring shaft assembly and the torsion shaft. The one or more outboard shaft support plates may include a wall bracket attached to the wall and a support arm extending perpendicularly from the wall bracket to receive and hold one or more of the ends of the torsion shaft. The outboard shaft support plates may limit the deflection of the torsion shaft in the middle of the torsion assembly, with one outboard shaft support plate on each side of the headplate. The outboard shaft support plates may be only required on doors with a weight of the spring shaft assembly and the torsion shaft great enough to cause substantial deflection.

In another aspect, a dock door assembly kit for installation and assembly in a dock door opening of a warehouse, the dock door assembly kit may comprise: a track assembly configured to be attached to a wall; a plurality of pre-assembled door panels; a spring shaft assembly; and a hardware carton comprising components required for final installation of the dock door assembly. The track assembly may include a pair of pre-assembled vertical tracks with each of the pre-assembled vertical tracks comprising a vertical roller track, a clip angle wall plate attached to the vertical roller track with a plurality of track clips, and a headplate. The headplate may have a U-shaped opening and may be attached to the clip angle wall plate and vertical track. Each of the pre-assembled vertical tracks may be configured to attach to opposing lateral sides of a door opening. Each pre-assembled door panel may comprise a plurality of horizontal door sections pre-assembled together with one or more section center plates and one or more section end cleats. The plurality of pre-assembled door panels connected together may define a multiple, horizontal section door characterized by a vertical height when closed and mounted on the track assembly. The door may be configured to be moveable on the track assembly between an open and a substantially vertical closed position. The spring shaft assembly may include a torsion shaft with pre-assembled components defined by a pair of cable drums with each cable drum located at an end of the torsion shaft, at least one counterbalance torsion spring extending along the torsion shaft, and at least one torque bracket adjacent the at least one counterbalance torsion spring. The ends of the torsion shaft may be configured to set in the U-shaped opening of the headplates. The components may include: one or more door cables, an interior lock, a door handle, one or more section center plates, one or more edge hinge assemblies, two corner cable brackets, two top fixtures, a plurality of rollers, a step plate, and a plurality of fasteners for the component installation.

In other embodiments of the dock door assembly kit, the plurality of pre-assembled door panels may include a top door panel and a bottom door panel. The top door panel may be comprised of two or three horizontal sections pre-assembled together with one section center plate and two section end cleats. The bottom door panel may be comprised of two or three horizontal sections pre-assembled together with two section center plates and four section end cleats. In yet a further embodiment of the dock door assembly kit, the hardware carton may include one or more outboard shaft support plates configured to be mounted to the wall to support the spring shaft assembly and the torsion shaft. The one or more outboard shaft support plates may include a wall bracket configured to be attached to the wall and a support arm extending perpendicularly from the wall bracket configured to receive and hold one or more of the ends of the torsion shaft.

BRIEF DESCRIPTION OF THE DRAWING

The foregoing summary, as well as the following detailed description of exemplary embodiments, is better understood when read in conjunction with the accompanying drawings, which are included by way of example, and not by way of limitation with regard to the claimed invention. In the detailed description which follows, reference will be made to the drawing comprised of the following figures:

The reader is advised that the attached drawings are not necessarily drawn to scale.

DETAILED DESCRIPTION OF EMBODIMENTS

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

Figure 1:
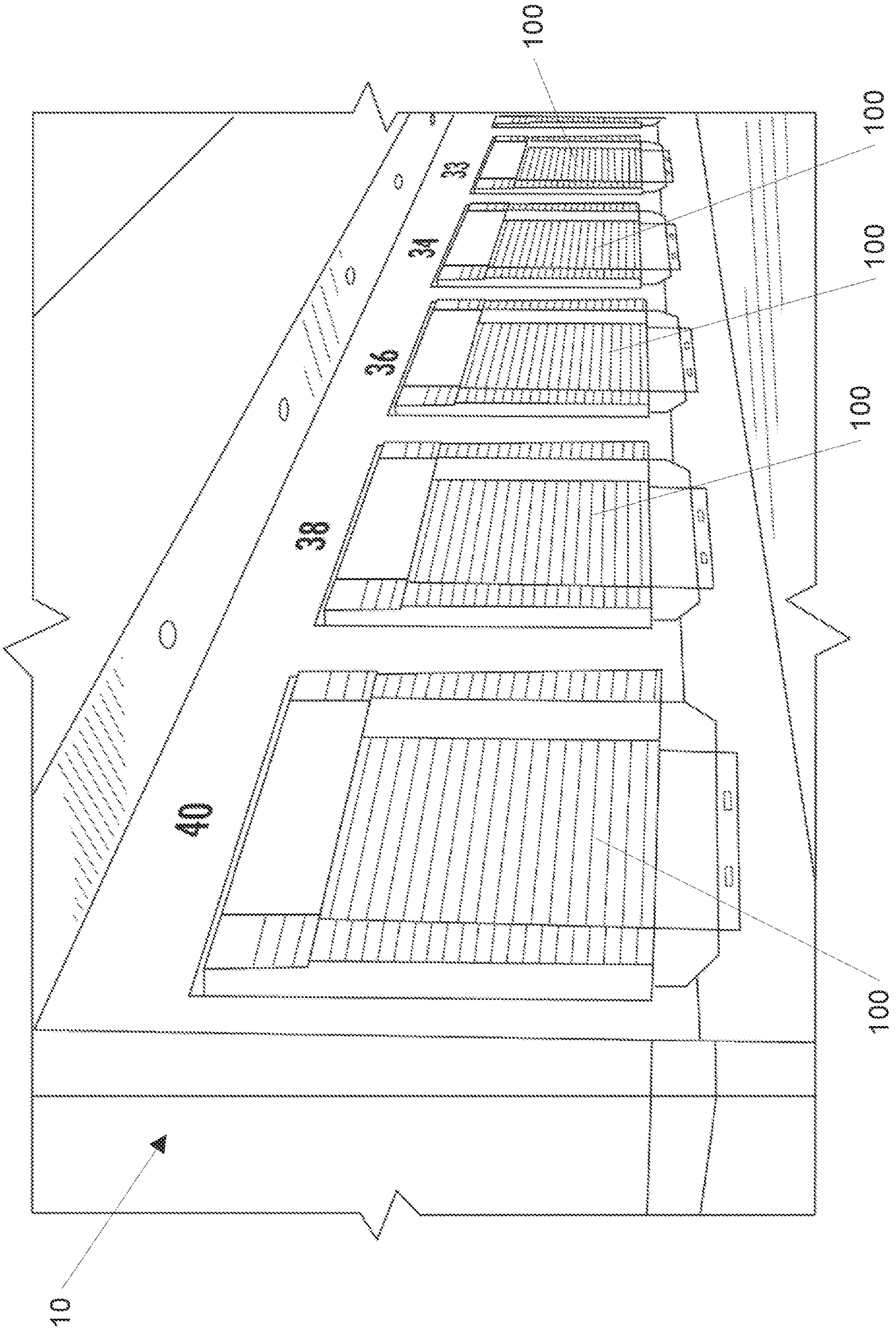
FIG. 1 is a perspective exterior view of a typical warehouse arrangement with various dock locations and dock doors in accordance with aspects of the invention.

Dock doors are an important piece to the warehouse and shipping market. Referring to FIG. 1, there is depicted a typical warehouse arrangement 10 with various dock locations and dock doors 110. The dock door assembly may be utilized for commercial sectional doors also. The dock door assembly might include minimal parts, such as pre-assembled door panels; pre-assembled clip angle track, headplates, and brackets; pre-assembled spring shaft assembly with counterbalance and drums set on the shaft. The dock doors 110 may be various sizes known and used in the art, such as 8'-2", 8'-4", 9'-2", or 9'-4" wide and 8', 9', or 10' high. The dock doors 110 may be various models and construction, such as 20 gauge steel, 24 gauge steel, 26 gauge steel, 2" thick sandwich polystyrene, or 2" thick polyurethane. A dock door assembly may include dock door tracks that may be various sizes, such as for example 2" and 3" tracks. The dock door assembly 100 may include windows, locks, and/or step plates. Other dock door sizes, dock door models and construction, and track sizes may be utilized without departing from this invention.

Figure 2A:
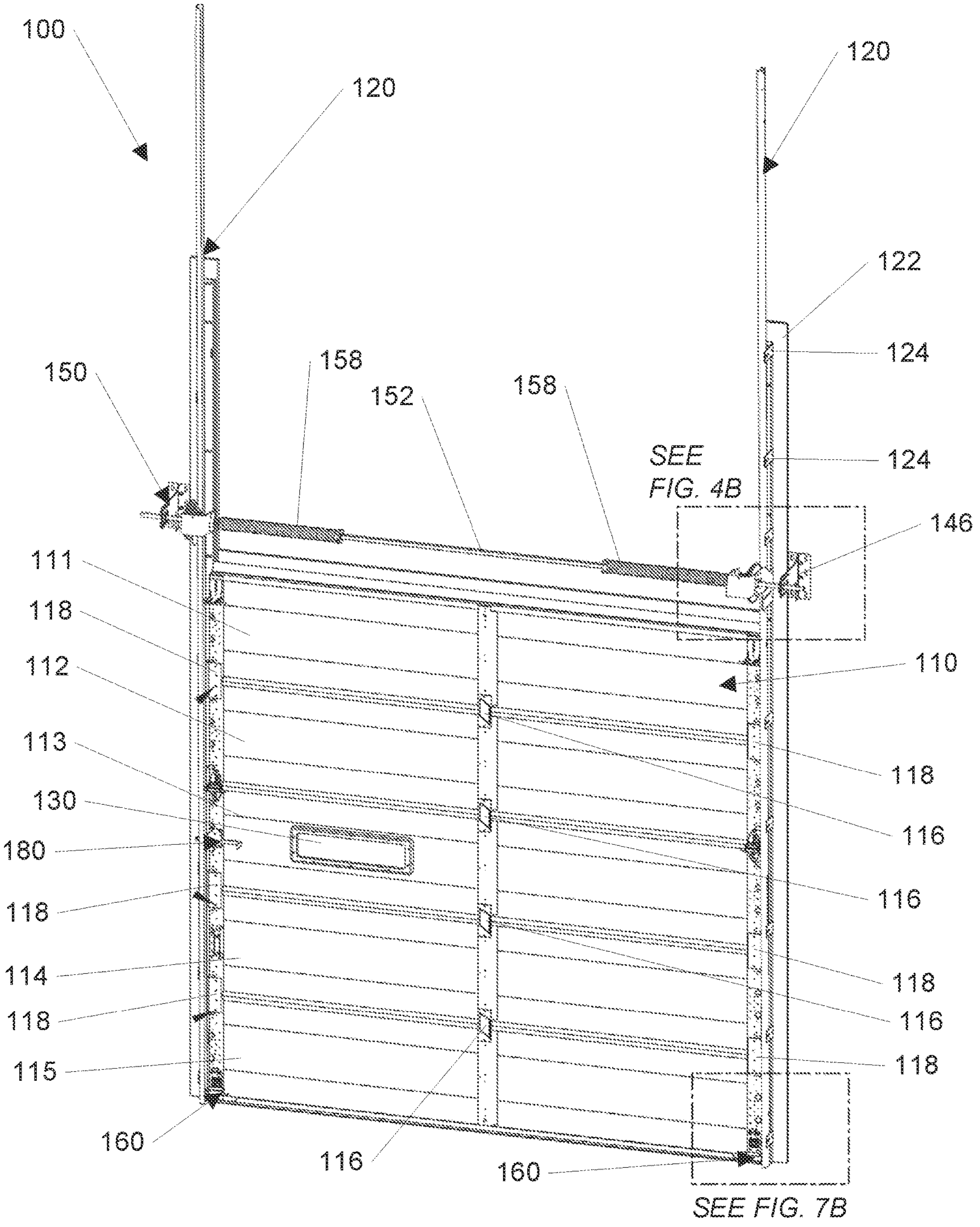
FIG. 2A is an isometric interior view sectional dock door assembly in accordance with aspects of the invention.
Figure 2B:
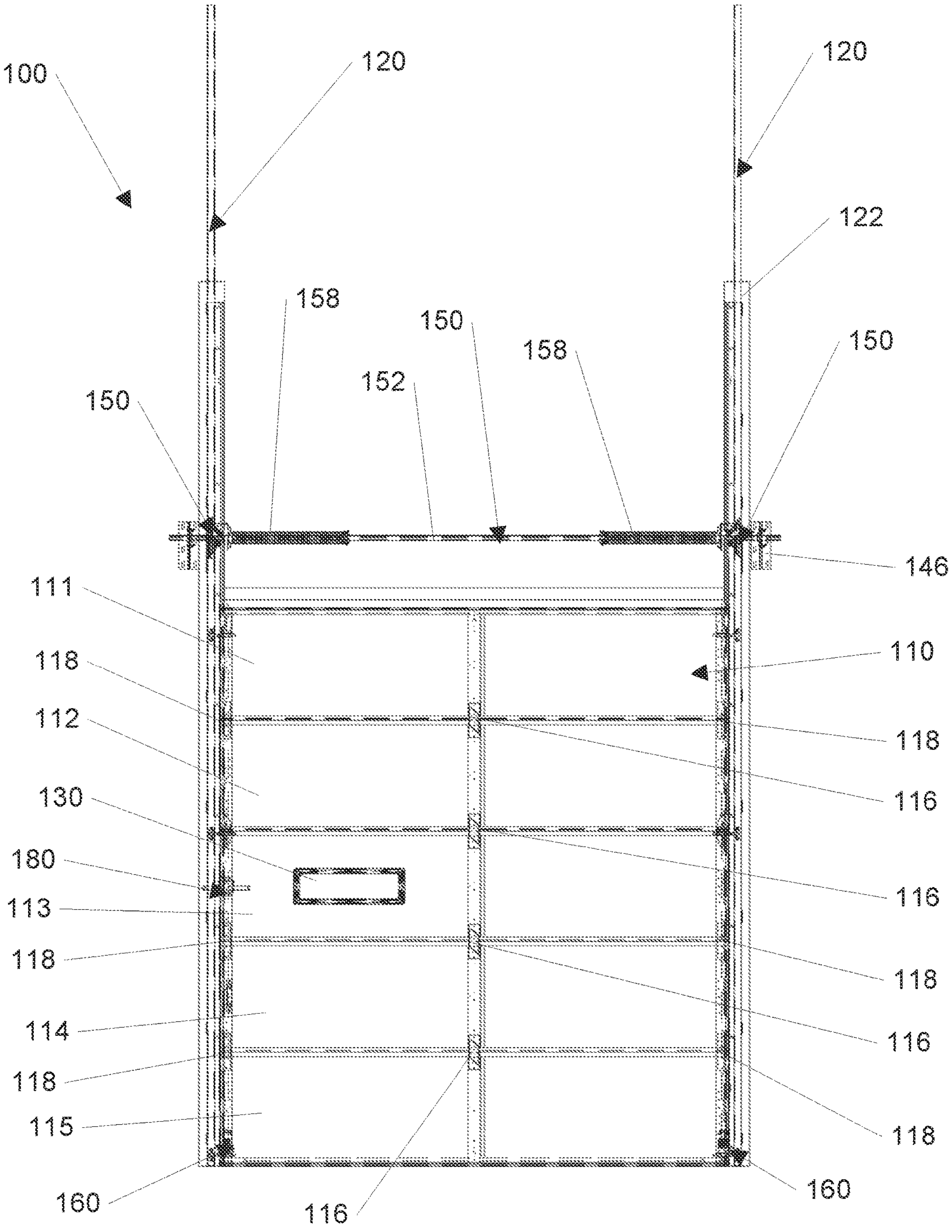
FIG. 2B is a front interior view of the dock door assembly from FIG. 2A in accordance with aspects of the invention.
Figure 2C:
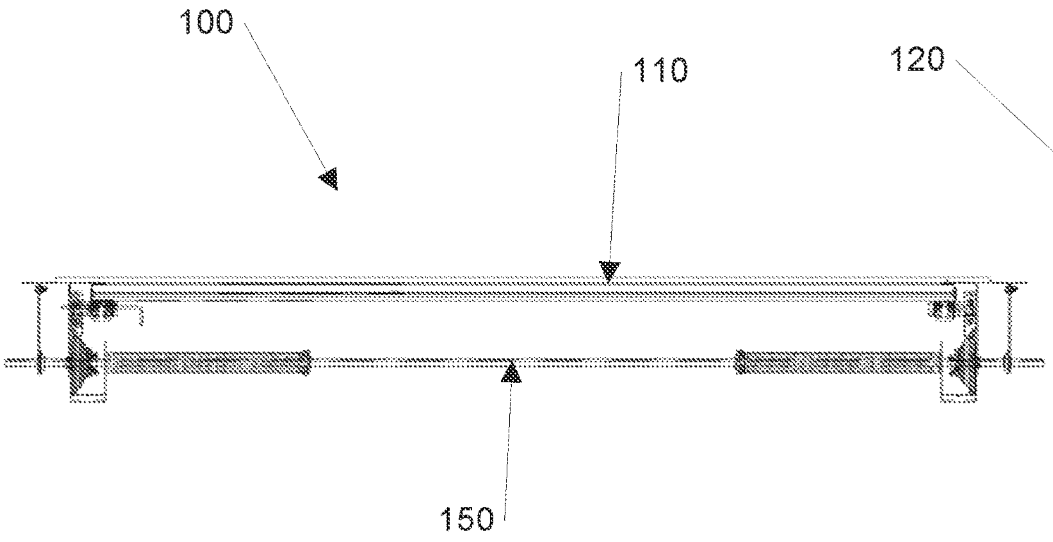
FIG. 2C is a top interior view of the dock door assembly from FIG. 2A in accordance with aspects of the invention.
Figure 2D:
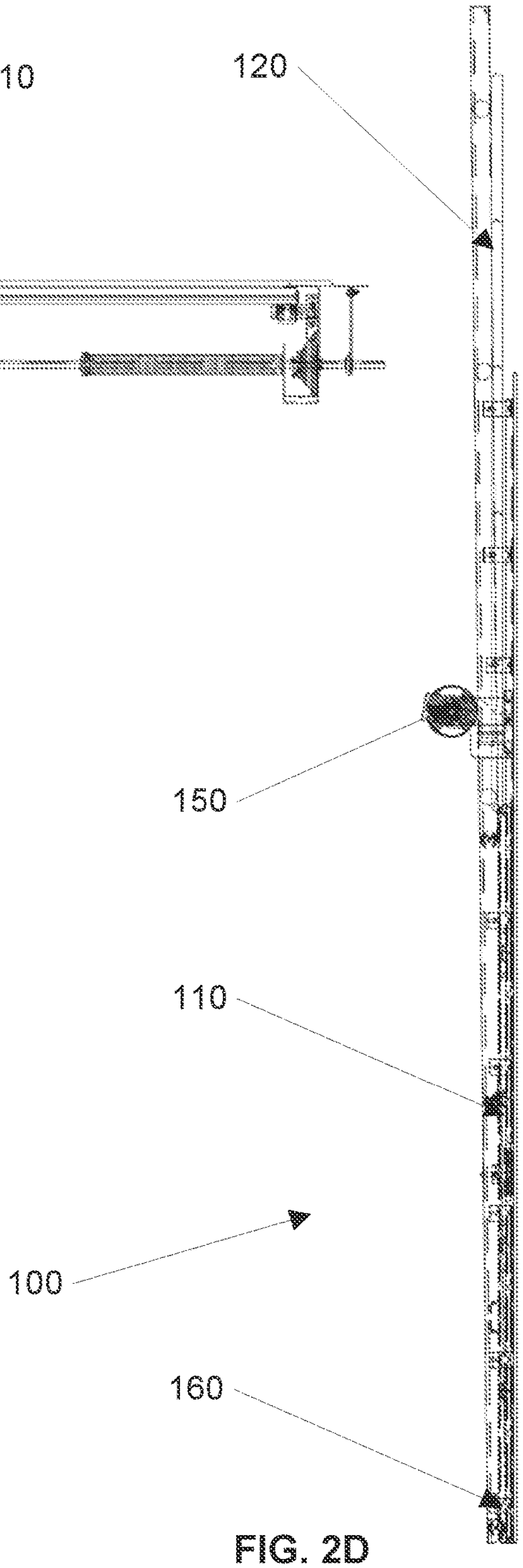
FIG. 2D is a side interior view of the dock door assembly from FIG. 2A in accordance with aspects of the invention.

Referring to FIG. 2A, there is depicted in an isometric view a new sectional dock door assembly 100. FIG. 2B depicts a front view of the dock door assembly 100. FIG. 2C depicts a top view of the dock door assembly 100. FIG. 2D depicts a side view of the dock door assembly 100. The dock door assembly 100 and dock door assembly kits (as detailed and described in reference to FIGS. 10A and 10B) may be installed quicker than equivalent prior art versions. For example, prior art dock door installation takes approximately 60-75 minutes using two installers. The dock door assembly 100 and dock door assembly kit installation of the present invention may take approximately 30 minutes and even as low as 24 minutes using two installers.

The dock door assembly 100 may include a multiple section, horizontal section dock door 110; a track assembly 120 configured to be attached to a wall; a torsion spring assembly 150 to raise and lower the dock door 110 along the track assembly 120; and a cable assembly 160 attached to the spring shaft assembly 150 with the dock door 110.

The dock door 110 may be made up of a series of horizontal sections 111, 112, 113, 114, 115. The horizontal sections 111, 112, 113, 114, 115 may be connected by section center plates 116 and section end cleats 118 using one or more fasteners. The section center plates 116 may be a flat plate without a pivoting hinge as utilized in prior art. The section end cleats 118 may be "L"-shaped plates with holes and fasteners. The section end cleats 118 may be utilized to allow for both reduced number of edge hinges and the packaging of multiple pre-assembled panels together. The section center plates 116 and the section end cleats 118 provide a clean, simple, and less moving parts for installation and operation. The horizontal sections 111, 112, 113, 114, 115 may be of different construction, materials and combinations of materials. For example, the section 113 depicted in FIGS. 2A and 2B includes a window 130. The composition and construction of the various sections thus provide a door construction which may vary in terms of materials, size, and weight.

The composite arrangement of the horizontal sections 111, 112, 113, 114, 115 are depicted from the inside view of the door construction as arranged to provide an access opening upon raising the array of composite sections upwardly guided by first and second multi-sectioned track assemblies 120 positioned inside of a building such as a warehouse or garage. Each of the track assemblies 120 may be attached to a wall along opposing lateral sides of the dock door opening. Each of the track assemblies 120 may include a clip angle wall plate 122, a plurality of track clips 124, a weather seal 125, and a vertical track 126 which guides wheels or rollers attached to the opposing lateral sides of the horizontal sections 111, 112, 113, 114, 115 on the opposing lateral sides thereof to guide the sections upwardly along the vertical track 126.

The dock door 110 may be raised or lowered by means of a spring shaft assembly 150. The spring shaft assembly 150 may be rotationally mounted above the top horizontal section 111 on a headplate 142 attached to the track assembly 120. Optionally, one or more outboard shaft support plates 144 may be mounted to the wall to provide support to the spring shaft assembly 150. The spring shaft assembly 150 may include a torsion shaft 152, one or more torque brackets 154, one or more cable drums 156, one or more bearings, and one or more torsion springs 158. The torsion springs 158 may provide a means to counterbalance the weight of the door construction. The cable drum 156 may be mounted on opposite ends of the torsion shaft 152 and be attached to the torsion shaft 152 to rotate coaxially therewith.

A cable assembly 160 may be attached to the spring shaft assembly 150 with the dock door 110. The cable assembly 160 may include a door cable 162 and a corner cable bracket 164 connecting the door cable 162 to the dock door 110. Each cable drum 156 may receive the door cable 162 which is cooperative respectively with the cable drum 156. One end of each door cable 162 may be attached, respectively, to the cable drum 156 associated therewith. Each door cable 162 may wind or unwind from the associated cable drum 156 upon rotation of the torsion shaft 142. The opposite end of each door cable 162 is attached to the lowest or lower horizontal section 115 at the corner cable bracket 164. Thus, in order to raise the dock door 110 from the closed position as depicted in FIGS. 2A and 2B, the torsion shaft 152 may be rotated appropriately to wind the appropriate door cable 162 on the appropriate drum 156. The winding and unwinding operation may involve rotating the torsion shaft 152 in the appropriate rotational sense relative to raising and lowering the dock door 110. Thus, movement of the dock door 110 may be affected by manually raising or lifting the spring counterbalanced dock door 110. One or more door cables 162, such as two door cables 162, may be utilized.

The torsion shaft 152 may be rotationally driven, for example, by an electric motor (not shown). Such opening of the dock door 110 may thus move the dock door 110 electronically using the electric motor from the closed position to an open position.

Figure 3A:
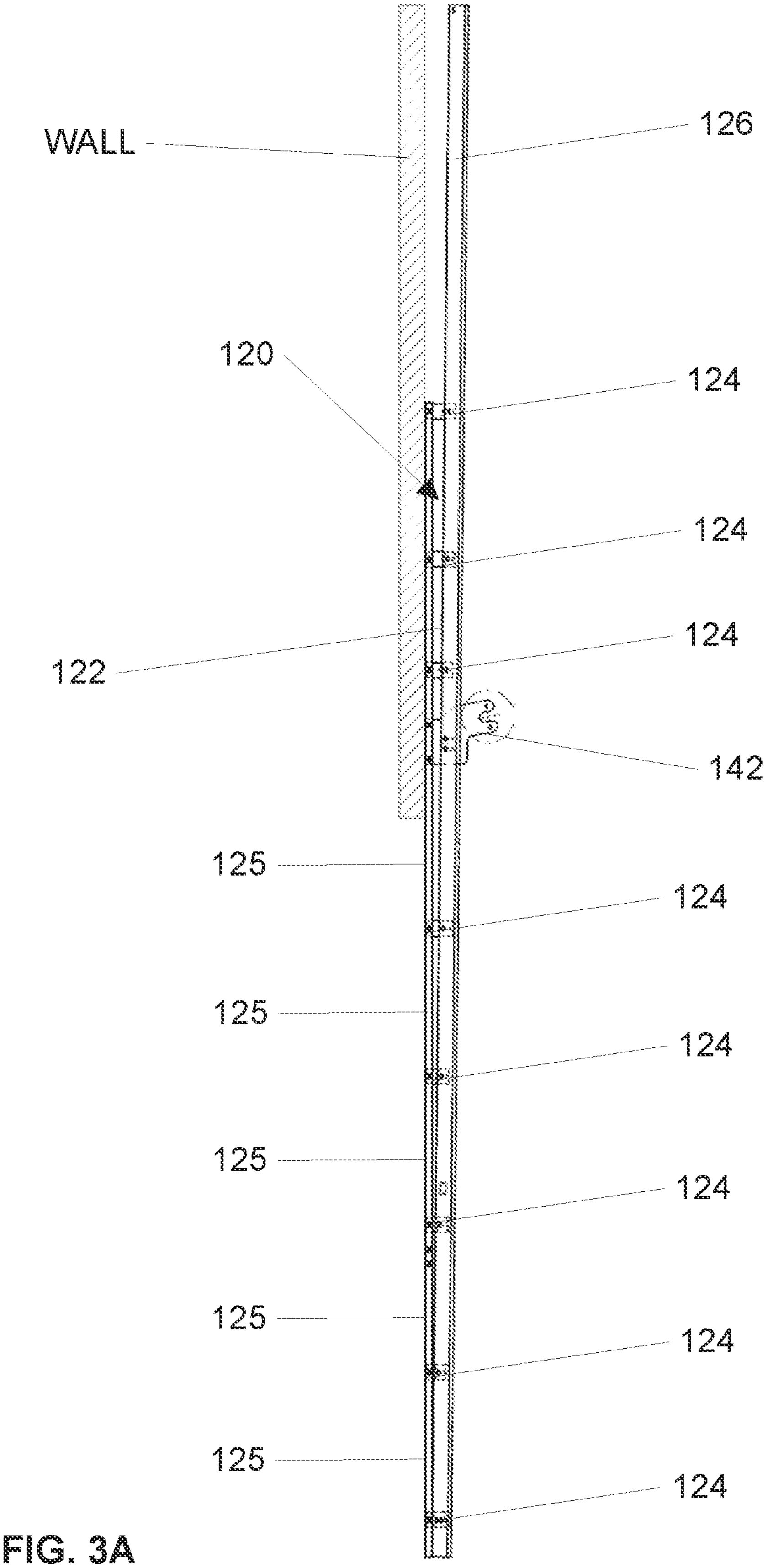
FIGS. 3A and 3B are side views of a track assembly of the dock door assembly from FIG. 2A in accordance with aspects of the invention.
Figure 3B:
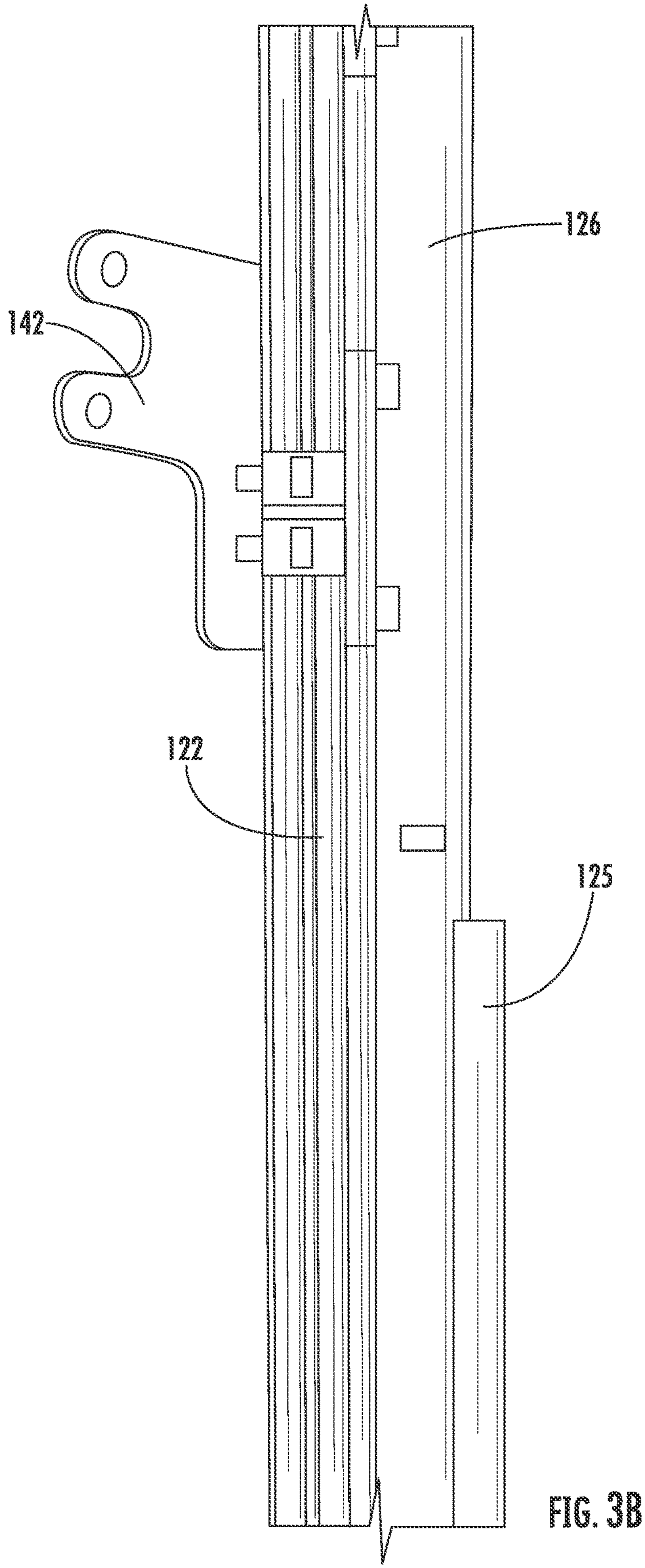

FIGS. 3A and 3B illustrate a side view of the track assembly 120. As illustrated in FIGS. 3A and 3B, the track assembly 120 may include a clip angle wall plate 122, a plurality of track clips 124, a weather seal 125, and a vertical track 126. The weather seal 125 may snap onto an edge of the clip angle wall plate 122. The clip angle wall plate 122 may be configured to mount to a wall of the building. The clip angle wall plate 122 may be defined by an "L" shape. The plurality of track clips 124 may connect the vertical track 126 to the clip angle wall plate 122 using one or more fasteners. As illustrated in FIG. 3A, the plurality of track clips 124 may include approximately eight track clips. Other numbers of track clips 124 may be utilized to attach the vertical track 126 to the clip angle wall plate 122, which may be based on and vary with the height of the door. As depicted in FIG. 3A, the vertical track 126 may be slightly angled away from the wall using the track clips 124. As will be explained and detailed further, the track assembly 120 may be pre-assembled to create a one-piece track style to save installation time. The track assembly 120 may also include type "A" track graduation so that the track assembly 120 may be installed tight to the wall. The track assembly 120 may be sized for various widths known and used in the art, for example, 2" tracks and 3" tracks. Other track sizes/widths may be used without departing from this invention. Additionally, the headplate 142 may be pre-assembled with the track assembly 120.

Figure 4A:
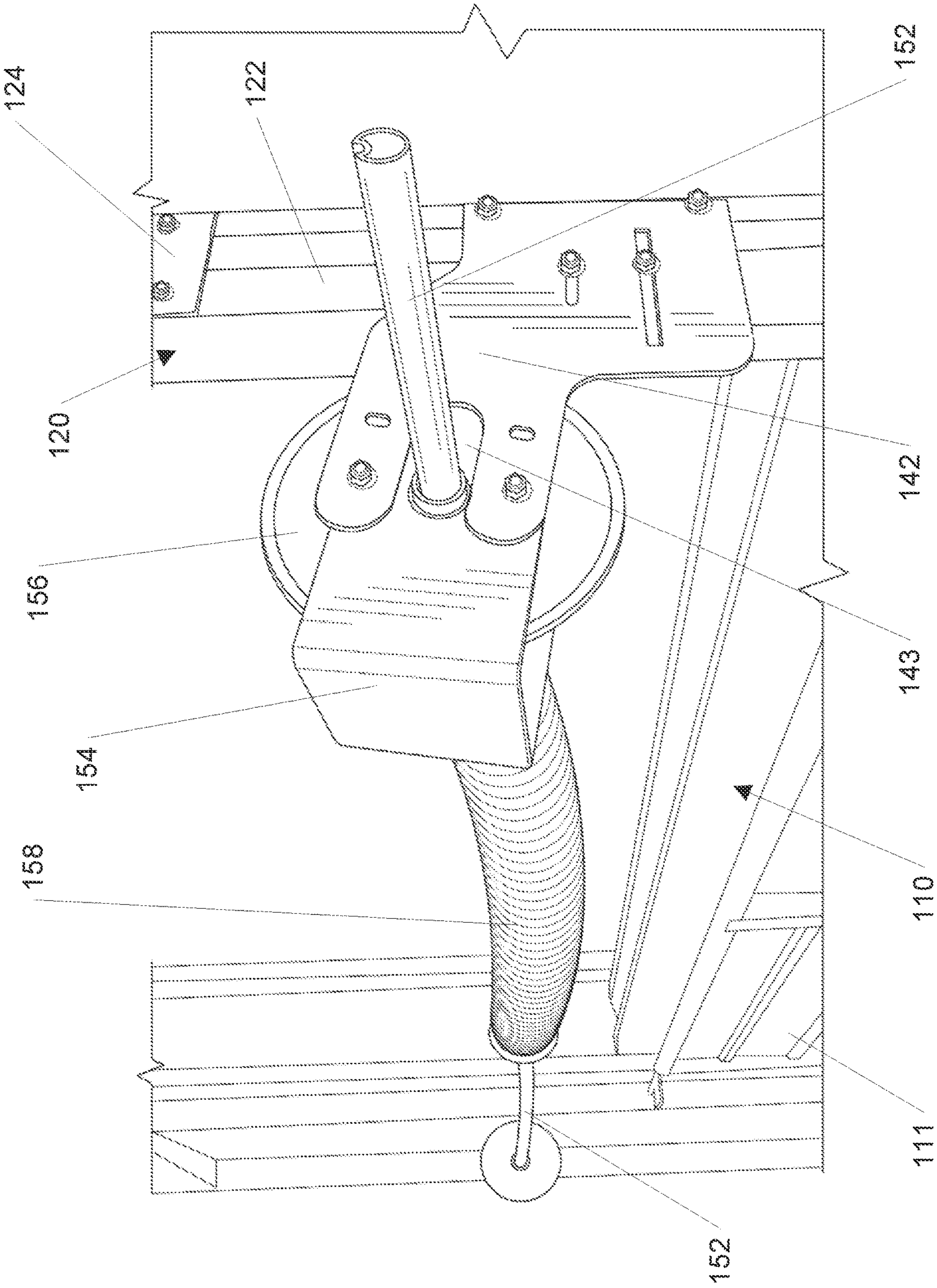
FIG. 4A is a side perspective view of a spring shaft assembly of the dock door assembly from FIG. 2A in accordance with aspects of the invention.
Figure 4B:
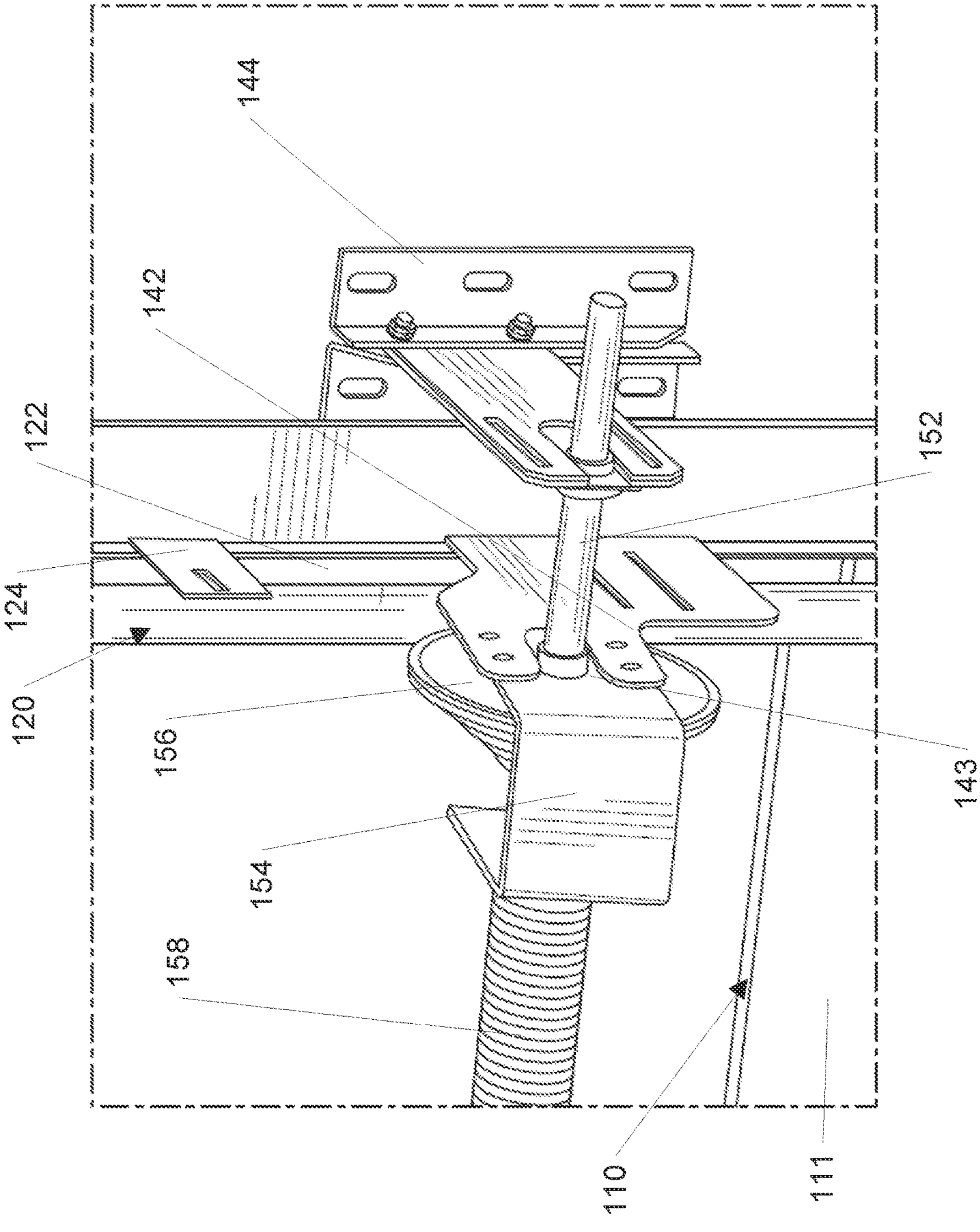
FIG. 4B is a perspective view of the spring shaft assembly taken from FIG. 2A of the dock door assembly in accordance with aspects of the invention.

FIGS. 4A and 4B illustrate views of and the spring shaft assembly 150 mounted on the headplate 142. FIG. 4A illustrates a spring shaft assembly 150 without an outboard shaft support plate 144. FIG. 4B illustrates the spring shaft assembly 150 with an outboard shaft support plate 144 mounted to the wall to support the torsion shaft 152. The outboard shaft support plate 144 may be required to reduce deflection of the torsion shaft 152 if the additional weight of the torsion springs 158 is over a pre-determined weight.

As illustrated in FIGS. 4A and 4B, the spring shaft assembly 150 may include a torsion shaft 152, one or more torque brackets 154, one or more cable drums 156, one or more bearings, and one or more torsion springs 158. As illustrated in FIGS. 4A and 4B, the headplate 142 may be connected to and/or fastened to the track assembly 120 and specifically the clip angle wall plate 122 and the vertical track 126 using one or more fasteners. The headplate 142 may extend perpendicular to the wall. The headplate 142 may include a U-shaped opening 143 for receiving each end of the torsion shaft 152. The U-shaped opening 143 may be angled upward to ensure that the torsion shaft 152 sets into the opening 143 and remains in the opening 143. The spring shaft assembly 150 may be front loaded and front mounted on the headplate 142, the track assembly 120, and the wall. As will be explained and detailed further, the spring shaft assembly 150 may be pre-assembled so that the entire spring shaft assembly 150 can be set into the headplate 142 and bolted into place to save installation time.

Additionally, as illustrated in FIGS. 4A and 4B, the spring shaft assembly 150 may be located approximately 6 inches to 48 inches above the header height above the top horizontal section 111 of the dock door 110. In another embodiment, the spring shaft assembly 150 may be located approximately 12 inches to 40 inches above the header height above the top horizontal section 111 of the dock door 110. In another embodiment, the spring shaft assembly 150 may be located approximately 16-½ inches above the header height above the top horizontal section 111 of the dock door 110. In other prior art dock door assemblies, the spring shaft assembly is located approximately 8-12 feet above the header height to avoid the interference between the dock door and the traditional A-frame mounting for the torsion spring 158 and shaft 152. Moving the spring shaft assembly 150 location down to the header height above the top horizontal section 111 of the dock door 110 allows for easier installation with safer working conditions by working at approximately twelve feet high instead of approximately 20-24 feet in the air as with prior art dock door assemblies.

Figure 5A:
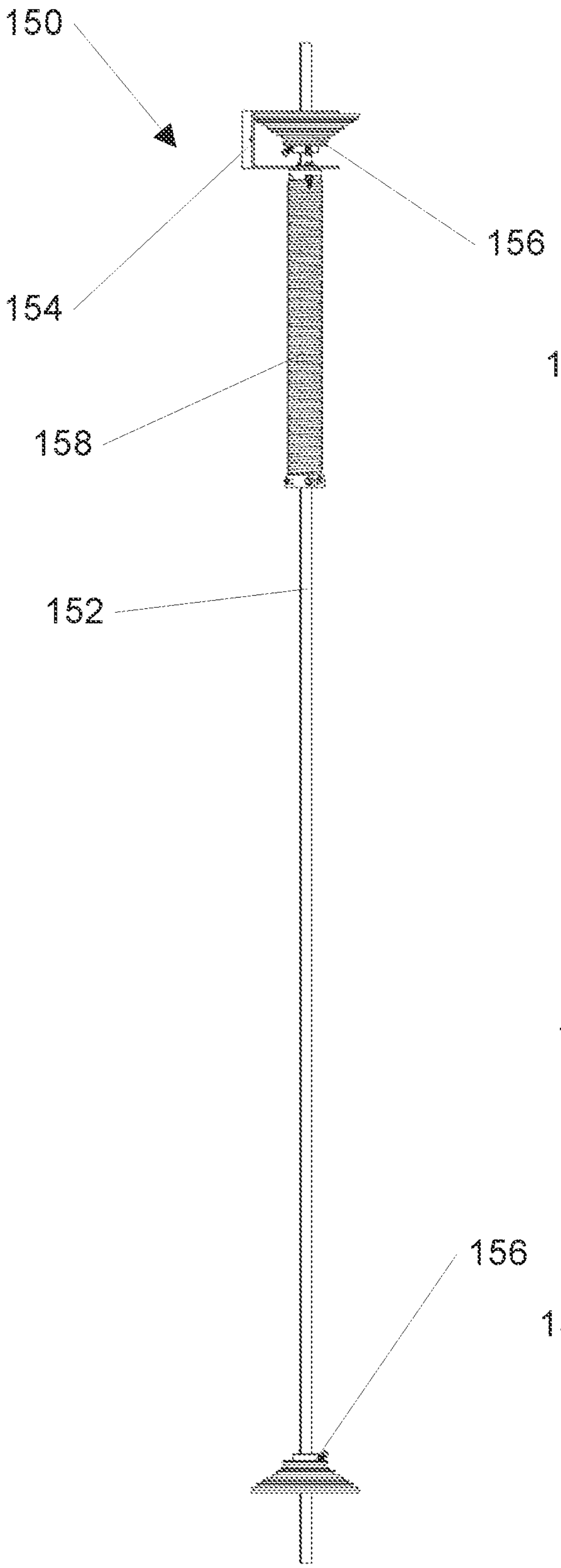
FIGS. 5A and 5B are top views of various embodiments of the spring shaft assembly of the dock door assembly from FIG. 2A in accordance with aspects of the invention.
Figure 5B:
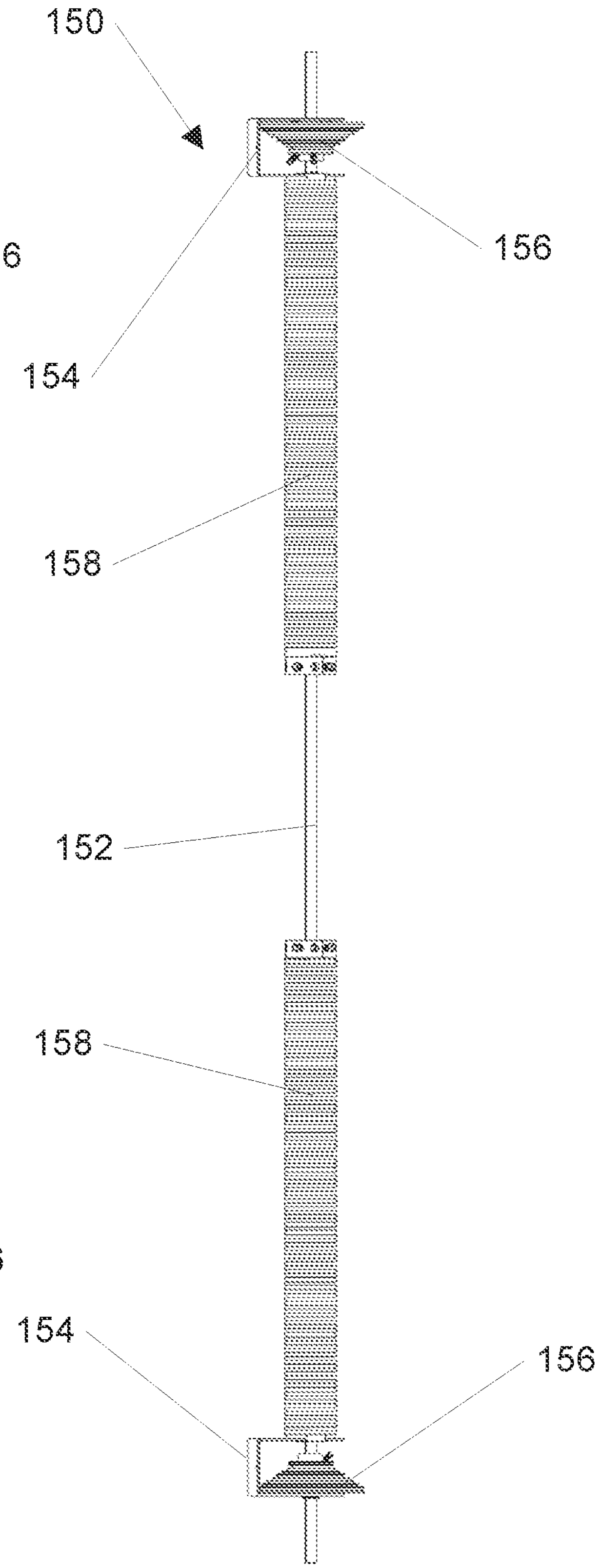

FIGS. 5A and 5B illustrate top views of two exemplary spring shaft assemblies 150. The spring shaft assembly 150 in FIG. 5A includes one torsion spring 158 located on one end of the torsion shaft 152. The spring shaft assembly 150 in FIG. 5B includes two torsion springs 158 with one torsion spring 158 located on each of the ends of the torsion shaft 152. Various sizes and lengths of springs 158 may be utilized with the spring shaft assembly 150 depending on the weight and size of the dock door 110.

Figure 6A:
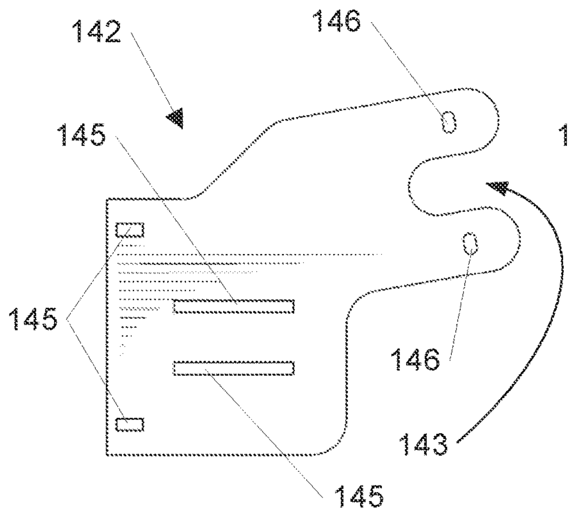
FIGS. 6A and 6B are various views of a headplate from the dock door assembly from FIG. 2A in accordance with aspects of the invention.
Figure 6B:
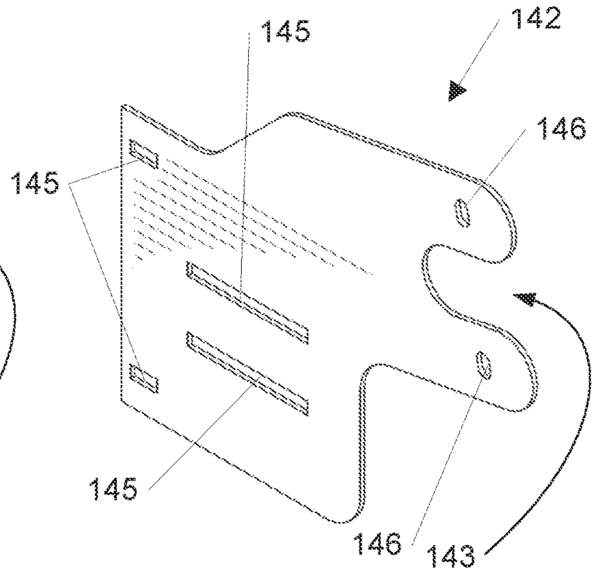

FIGS. 6A-6D illustrate various views of components of the spring shaft assembly 150. FIGS. 6A and 6B illustrate a front view and a perspective view of the headplate 142. As illustrated in FIGS. 6A and 6B, the headplate 142 includes a U-shaped opening 143. The headplate 142 may also include various slots and/or holes 145 for attaching to the clip angle wall plate 122 and the vertical track 126. The headplate 142 may also include locking holes 146 at the arms of the opening 143 to hold the torsion shaft 152 in place in the U-shaped opening 143 on the headplate 142 using one or more fasteners.

Figure 6C:
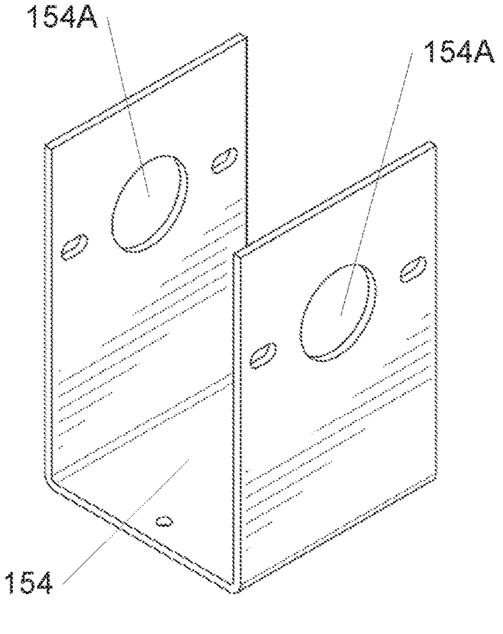
FIG. 6C is a side perspective view of a torque bracket from the dock door assembly from FIG. 2A in accordance with aspects of the invention.

FIG. 6C illustrates a perspective view of the torque bracket 154. The torque bracket 154 may include two main holes 154A to receive and hold the torsion shaft 152 next to the torsion spring 158.

Figure 6D:
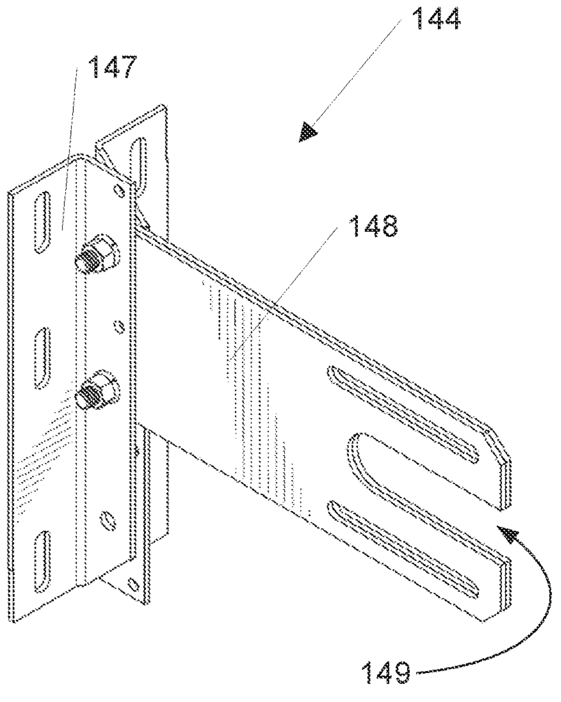
FIG. 6D is a side perspective view of an outboard shaft support plates from the dock door assembly from FIG. 2A in accordance with aspects of the invention.

FIG. 6D illustrates a perspective view of the outboard shaft support plate 144. As stated above, the outboard shaft support plate 144 may be optionally mounted to the wall to support the spring shaft assembly 150 and the torsion shaft 152. The outboard shaft support plate 144 may be required if the additional weight of the torsion springs 158 is over a pre-determined weight. The outboard shaft support plate 144 may include a wall bracket 147 and a support arm 148 extending perpendicular to the wall bracket 147. The support arm 148 may include a slot 149 to receive the ends of the torsion shaft 152. The outboard shaft support plate 144 may include various holes and/or slots to attach to the wall using one or more fasteners. The outboard shaft support plate 144 may also include various holes and/or slots to hold/lock the torsion shaft 152 in place within the slot 149 using one or more fasteners. The spring shaft assembly 150 may also include one or more bearings with set screws to help support the load, and allow rotational or sliding motion of the spring shaft assembly 150.

Figure 7A:
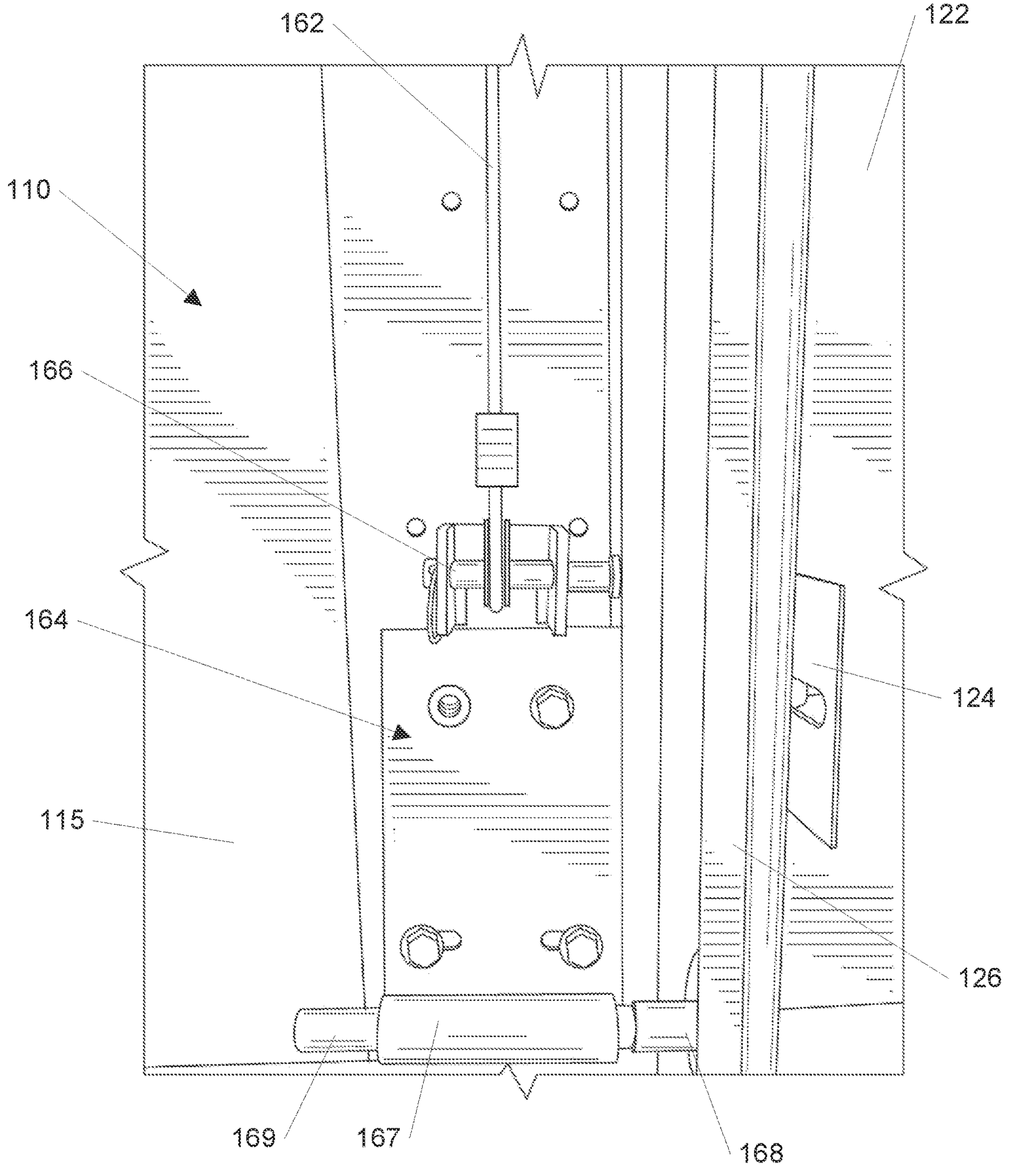
FIGS. 7A and 7B are front perspective views of a cable assembly of the dock door assembly from FIG. 2A in accordance with aspects of the invention.
Figure 7B:
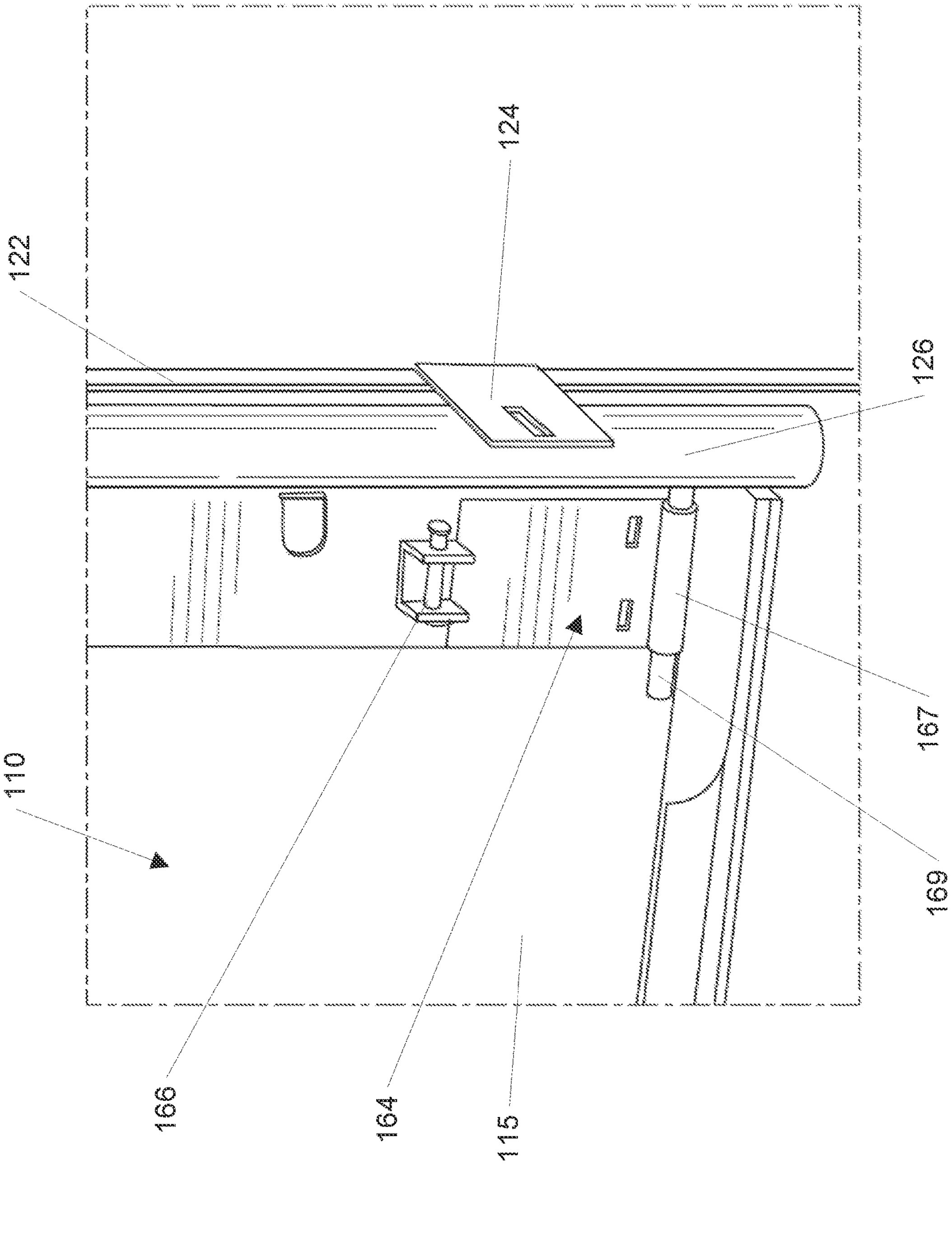

FIGS. 7A and 7B illustrate a cable assembly 160 that may be attached to the spring shaft assembly 150 with the dock door 110. FIG. 7A illustrates a front view of the cable assembly 160. FIG. 7B illustrates a perspective front view of the cable assembly 160 from FIG. 2A. The cable assembly 160 may include a door cable 162 and a corner cable bracket 164 connecting the door cable 162 to the dock door 110. The corner cable bracket 164 may be located at the lowest or lower horizontal section 115. The corner cable bracket 164 may include a door cable pick-up 166 to connect the door cable 162 to the corner cable bracket 164. The door cable 162 may be attached to the door cable pick-up 166 by various methods known and used in the art. The door cable pick-up 166 may be located at the front of the dock door 110. The door cable pick-up 166 may be repositioned from prior art versions. This repositioning and locating the door cable pick-up 166 at the front of the door eliminates any cable interference during door operation from the repositioning of the spring shaft assembly 150 to the front of the dock door 110 and at approximately 16-½ inches above the header above the top horizontal section 111 of the dock door 110.

As further illustrated in FIGS. 7A and 7B, the corner cable bracket 164 includes a tubular shape 167 to hold roller shaft 169 of a roller wheel 168 in the corner cable bracket 164. The roller wheel 168 may be held in the vertical track 126 of the track assembly 120.

Figure 8A:
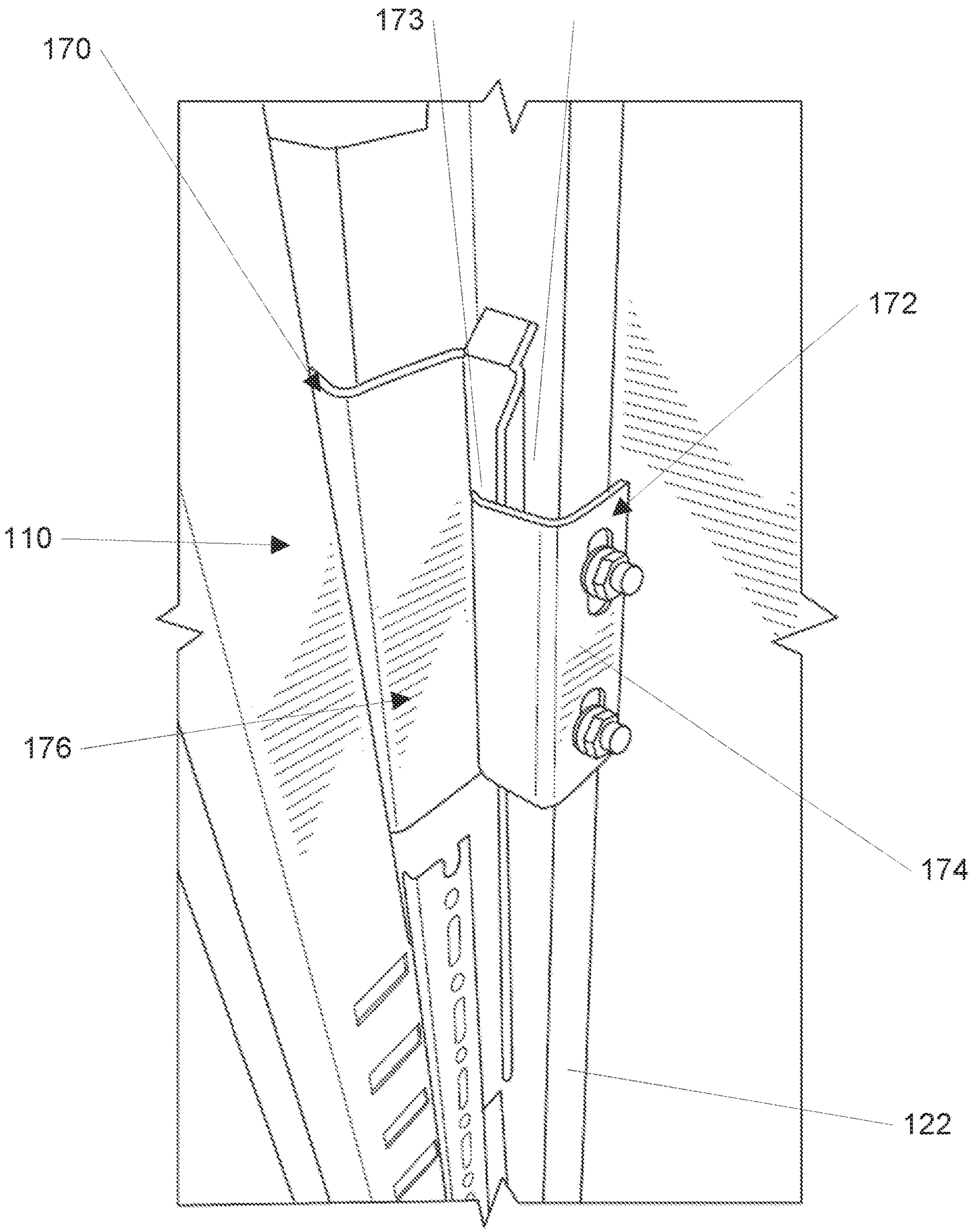
FIG. 8A is a side perspective view of a windload lock from the dock door assembly from FIG. 2A in accordance with aspects of the invention.
Figure 8B:
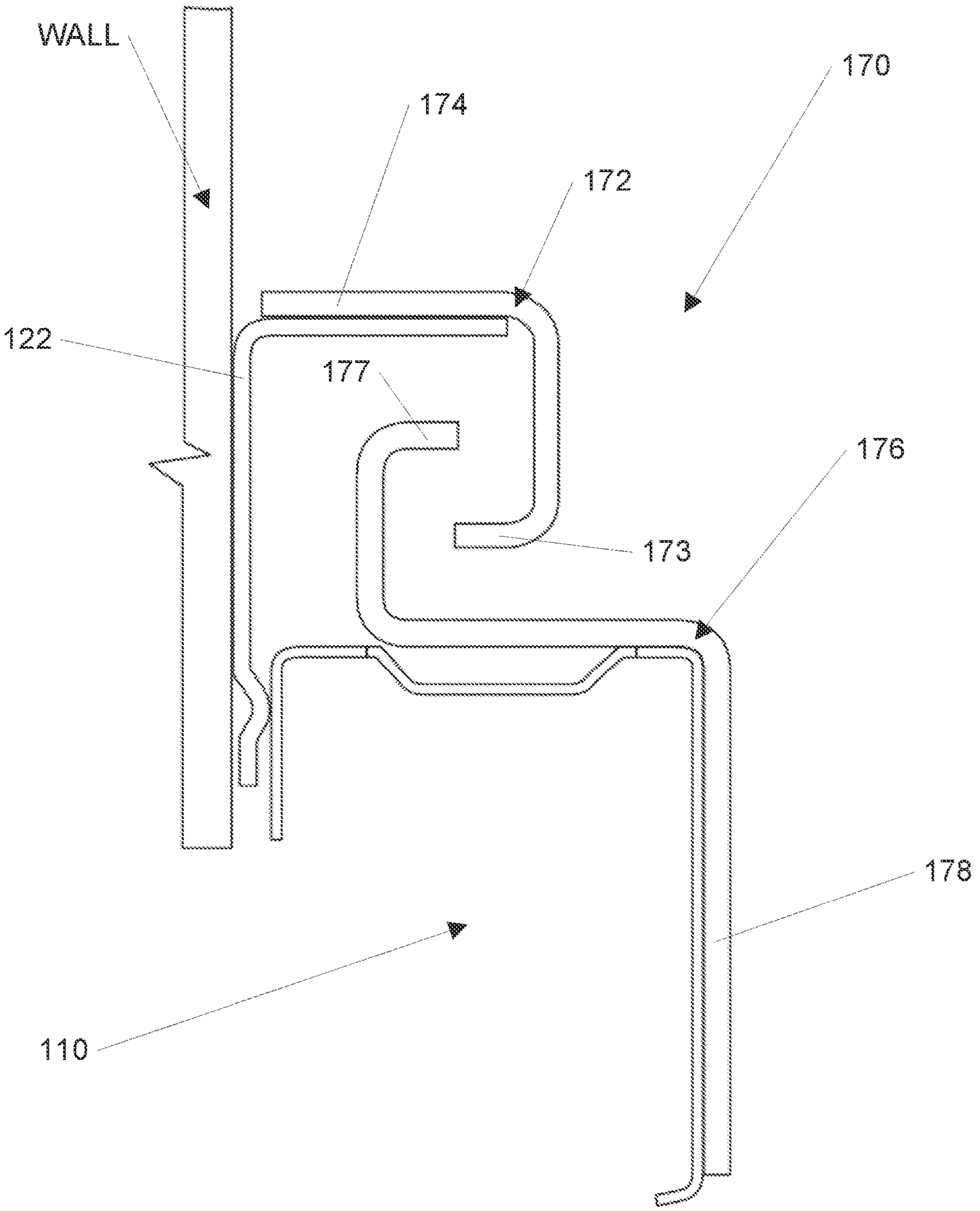
FIG. 8B is a top view of the windload lock from the dock door assembly from FIG. 2A in accordance with aspects of the invention.
Figure 8D:
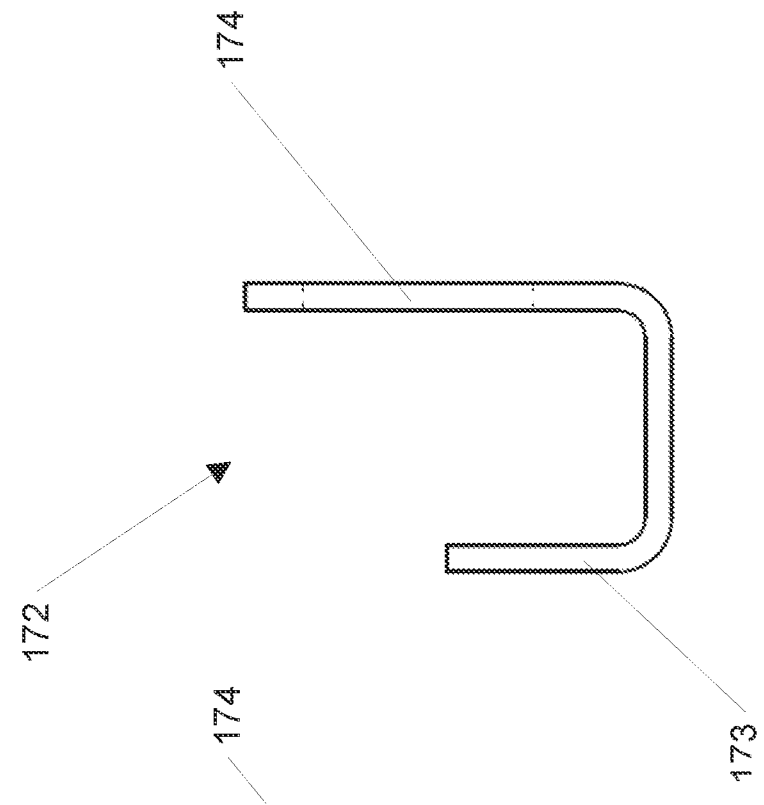
FIGS. 8C and 8D are various views of a wall cleat from the windload lock from the dock door assembly from FIG. 2A in accordance with aspects of the invention.
Figure 8C:
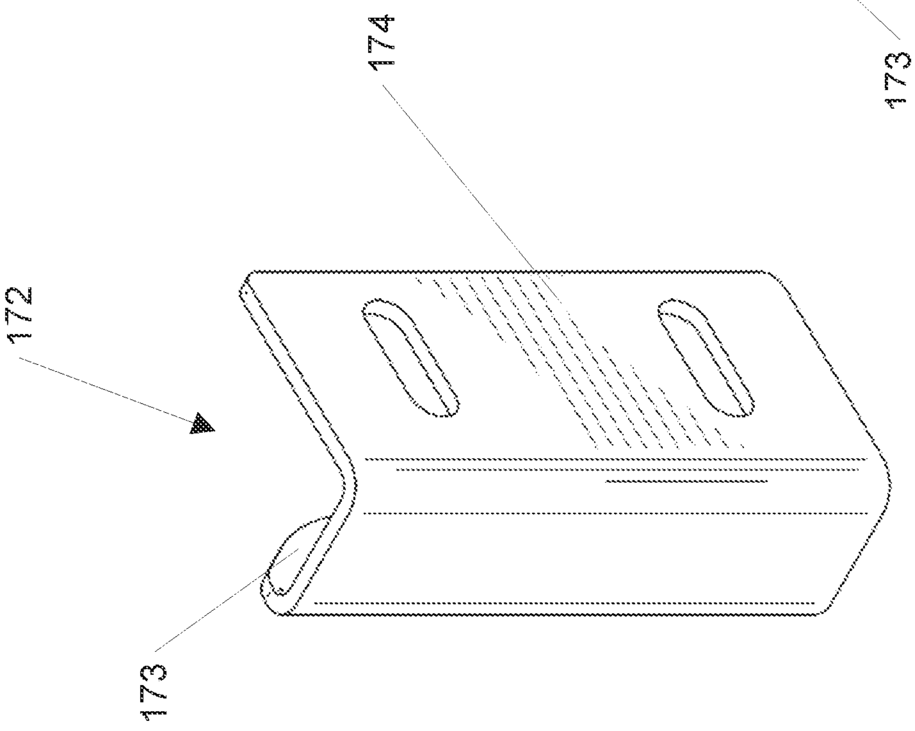
Figure 8G:
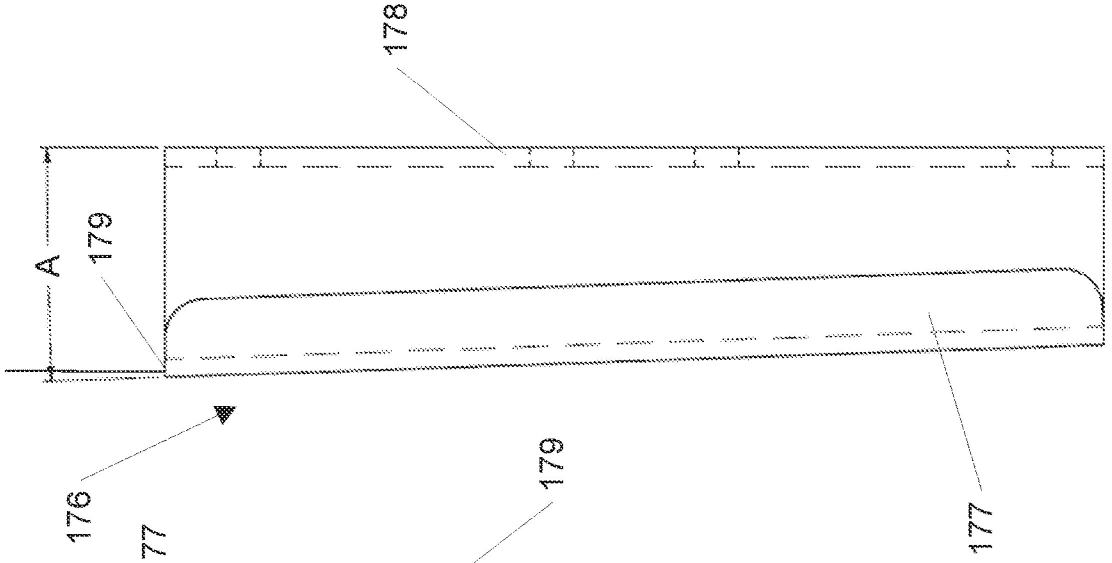
FIGS. 8E-8G are various views of a door cleat from the windload lock from the dock door assembly from FIG. 2A in accordance with aspects of the invention.
Figure 8F:
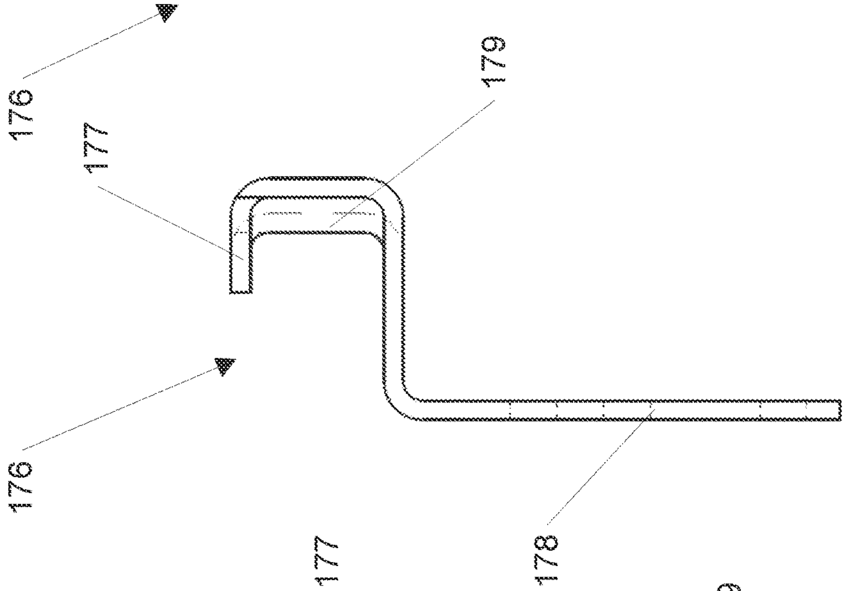
Figure 8E:
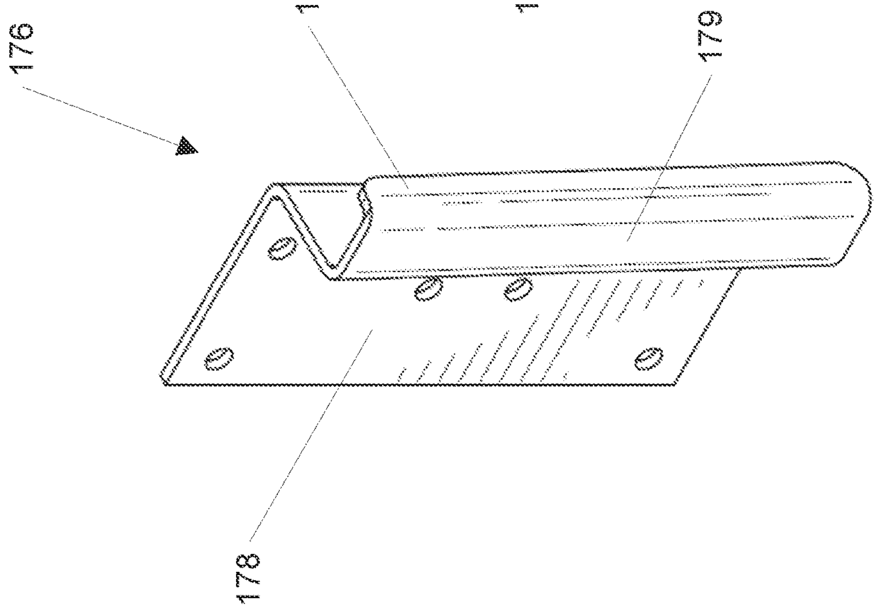

FIGS. 8A-8G illustrate a windload lock (or wind lock) 170 that may be utilized with the dock door assembly 100 in accordance with aspects of the invention. FIG. 8A illustrates a perspective front view of the windload lock 170 installed with the dock door assembly 100. FIG. 8B illustrates a top view of the windload lock 170. FIG. 8C illustrates a perspective view of a wall cleat 172 as part of the windload lock 170. FIG. 8D illustrates a top view of the wall cleat 172 from the windload lock 170. FIG. 8E illustrates a perspective view of a door cleat 176 as part of the windload lock 170. FIG. 8F illustrates a top view of the door cleat 176 from the windload lock 170. FIG. 8G illustrates a side view of the door cleat 176 from the windload lock 170.

The windload lock 170 may act as a windload cleat that provides seal and security of the dock door 110 to the door jamb without using the typical number of edge hinges. The windload lock 170 may keep the door tight to the door jamb for windload resistance. The windload lock 170 may include a wall cleat 172 and a door cleat 176 to cooperatively engage and secure the dock door 110 for windload resistance and reducing air infiltration. The wall cleat 172 may be attached to the wall and specifically the clip angle wall plate 122. The door cleat 176 may be attached to the dock door 110 and one of the horizontal sections 111, 112, 113, 114, 115 in place of the section end cleat 118. As illustrated in FIGS. 8A and 8B, the wall cleat 172 and the door cleat 176 may engage with each other to secure the door 110 against the door jamb.

FIGS. 8C and 8D depicts the wall cleat 172 of the windload lock 170. The wall cleat 172 may include a wall cleat extension arm 173 that extends from a wall cleat support plate 174. The wall cleat support plate 174 may attach and/or fasten to the wall and the clip angle wall plate 122 using one or more holes in the wall cleat support plate 174 and one or more fasteners.

FIGS. 8E, 8F, and 8G depicts the door cleat 176 of the windload lock 170. The door cleat 176 may include a door cleat extension arm 177 that extends from a door cleat support plate 178. The door cleat support plate 178 may attach and/or fasten to the dock door 110 using one or more holes in the door cleat support plate 178 and one or more fasteners. Additionally, as illustrated in FIG. 8G, the door cleat 176 may include an angled portion 179 with an angle of A. The angle A may be approximately 2 degrees in an exemplary embodiment. Other angles may be utilized with the angle A without departing from the invention. The angled portion 179 may provide a lead-in when the wall cleat 172 and the door cleat 176 come into contact as the door 110 moves into the closed position. The angled portion 179 may also work to pulls the door 110 tighter against the door jamb and weather seal 125 to reduce air infiltration. Additionally, the angled portion 179 may be at a right angle to the body of the door cleat 176 so that the door cleat 176 sits at an angle and achieves the same effect.

The wall cleat extension arm 173 and the door cleat extension arm 177 may be sized and shaped to ensure engagement with and cooperation with each other when the dock door 110 moves outwardly from the door jamb. For example, the wall cleat extension arm 173 may be approximately one inch long and the door cleat extension arm 177 may be approximately ½ inch long. Other lengths for the wall cleat extension arm 173 and the door cleat extension arm 177 may be utilized without departing from this invention.

Figure 8I:
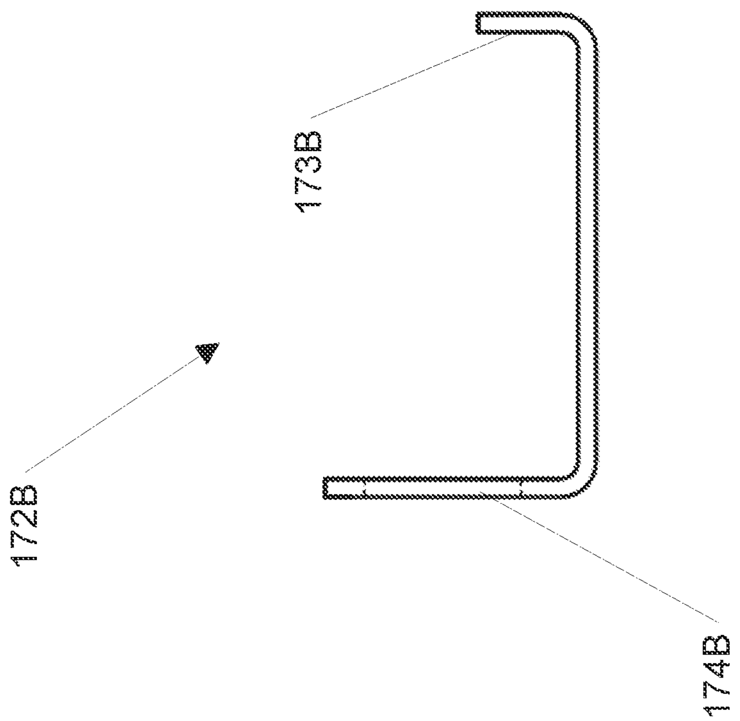
FIGS. 8H and 8I are various views of another wall cleat from the windload lock from the dock door assembly from FIG. 2A in accordance with aspects of the invention.
Figure 8H:
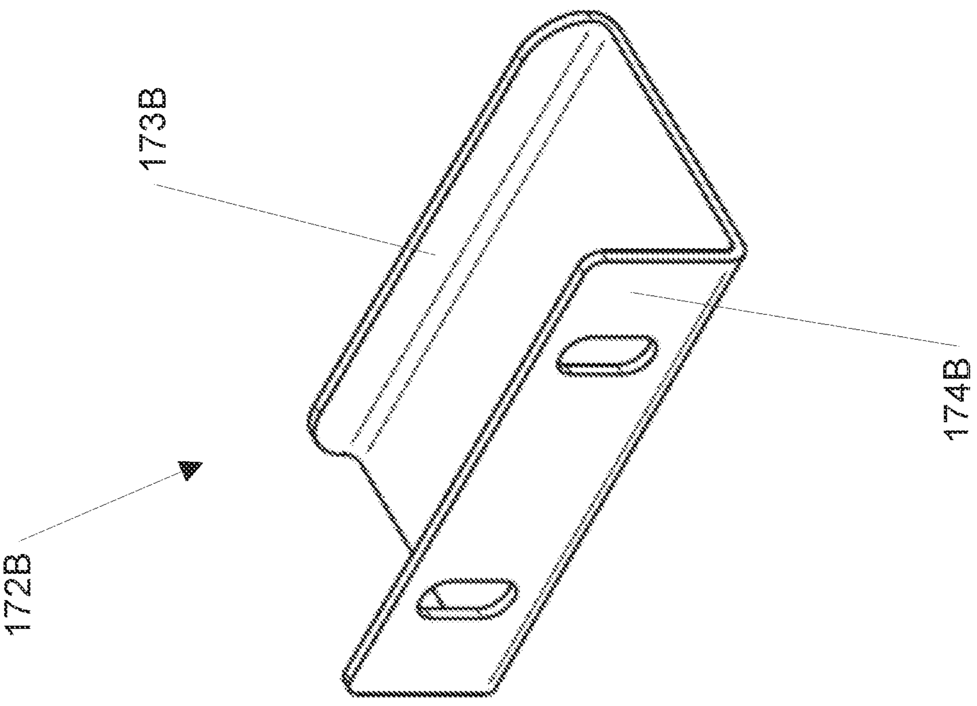

FIGS. 8H and 8I illustrate another wall cleat 172B that could be utilized with the windload lock 170. The wall cleat 172B may include a wall cleat extension arm 173B that extends from a wall cleat support plate 174B. The wall cleat support plate 174B may attach and/or fasten to the wall and the clip angle wall plate 122 using one or more holes in the wall cleat support plate 174B and one or more fasteners.

Figure 8K:
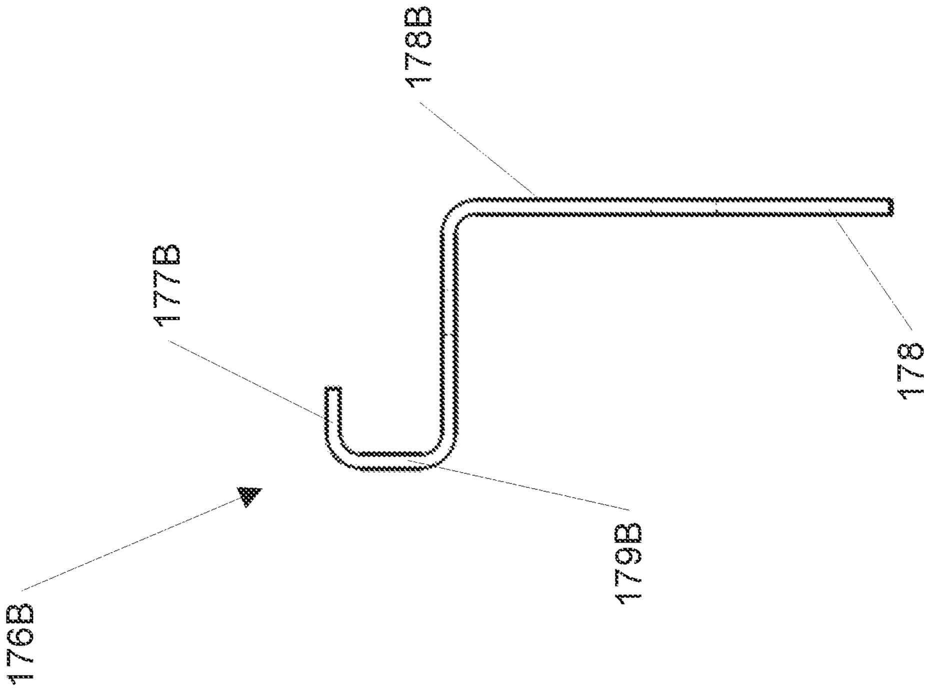
FIGS. 8J and 8K are various views of another door cleat from the windload lock from the dock door assembly from FIG. 2A in accordance with aspects of the invention.
Figure 8J:
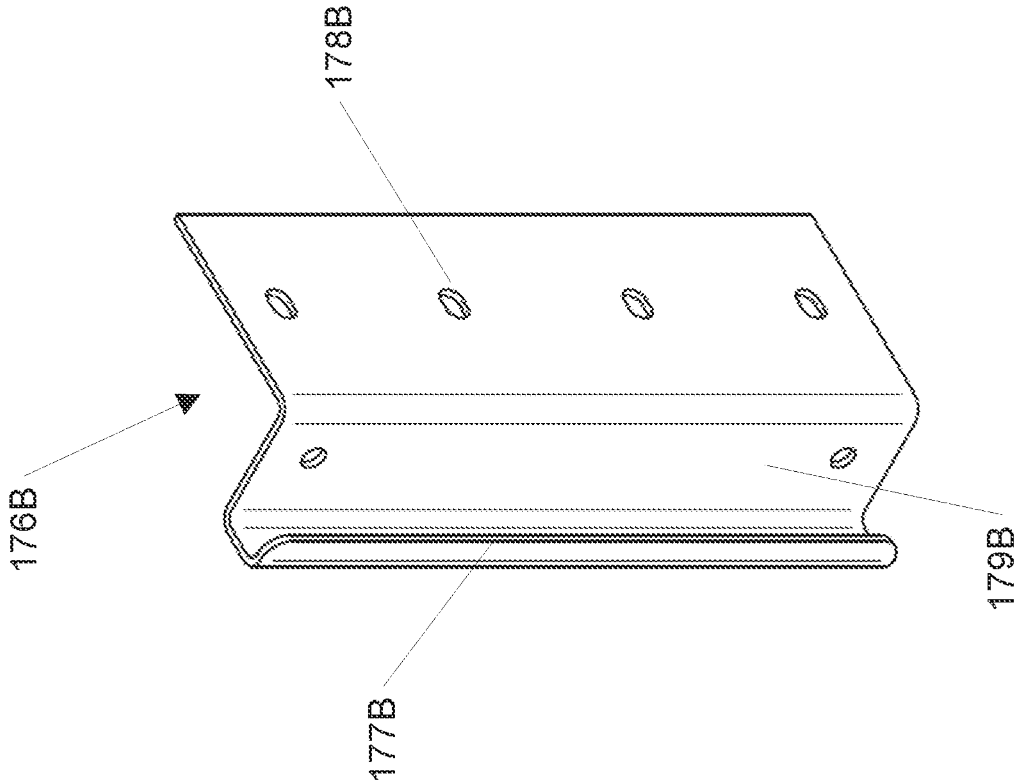

FIGS. 8J and 8K illustrate another door cleat 176B that could be utilized with the windload lock 170 and the wall cleat 172B. The door cleat 176B may include a door cleat extension arm 177B that extends from a door cleat support plate 178B. The door cleat support plate 178B may attach and/or fasten to the dock door 110 using one or more holes in the door cleat support plate 178B and one or more fasteners.

Figure 9A:
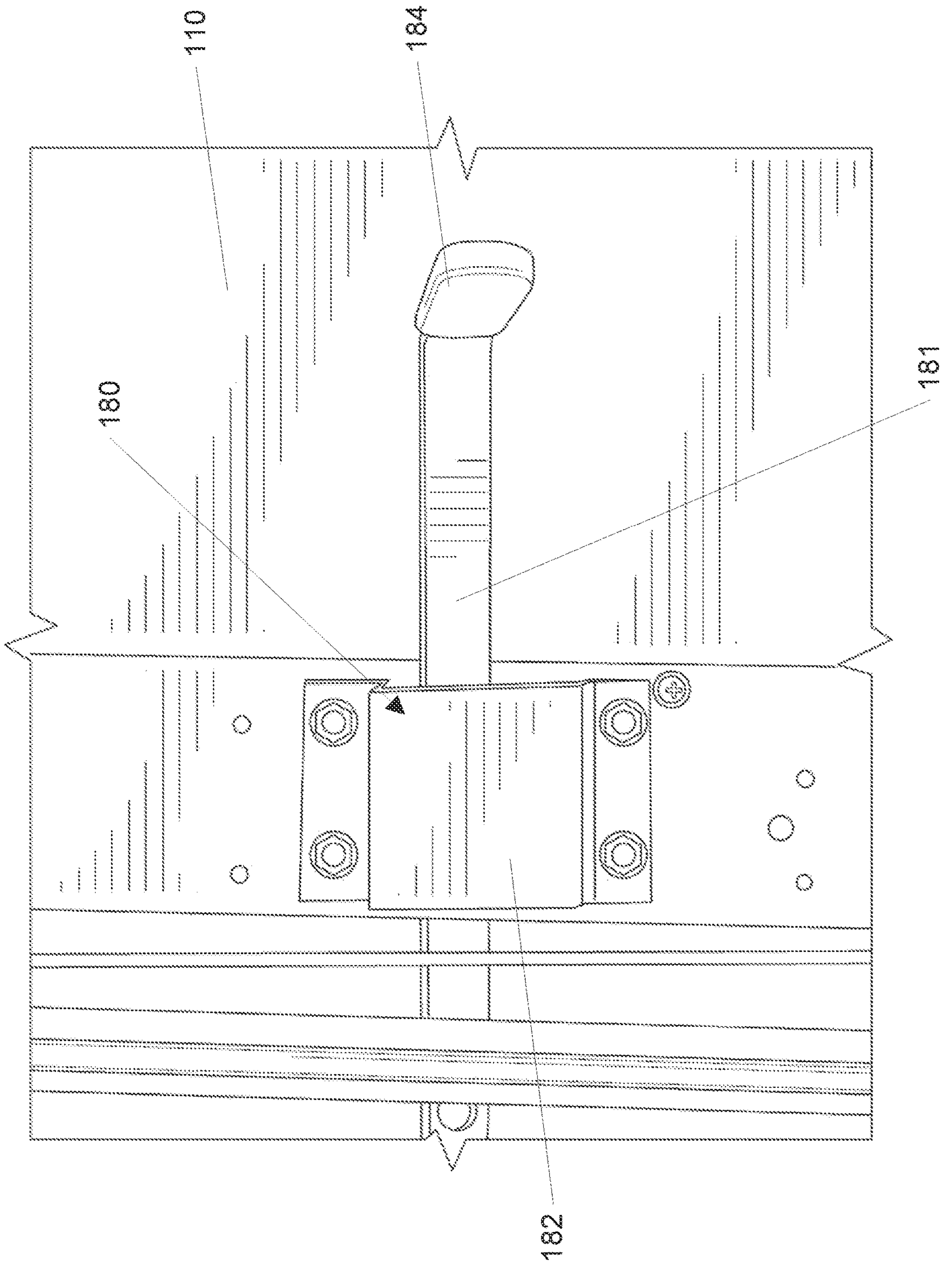
FIGS. 9A-9D are various views of an interior lock from the dock door assembly from FIG. 2A in accordance with aspects of the invention.
Figure 9B:
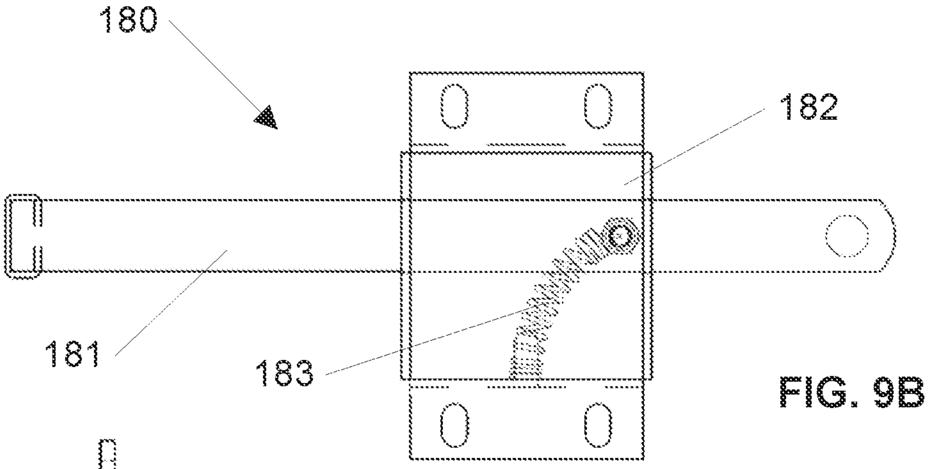
Figure 9C:
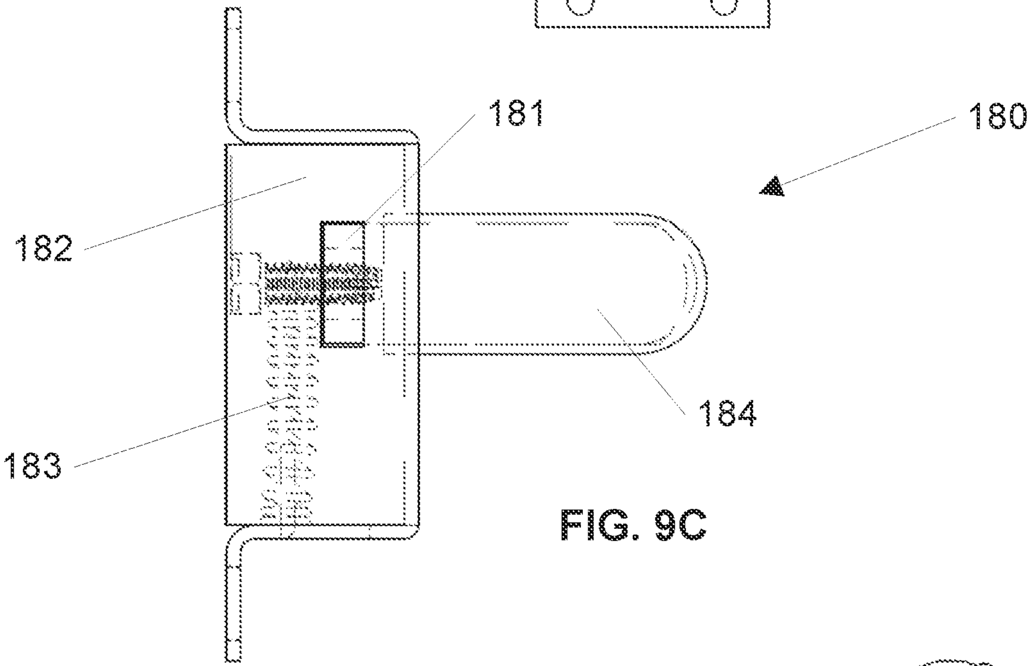
Figure 9D:
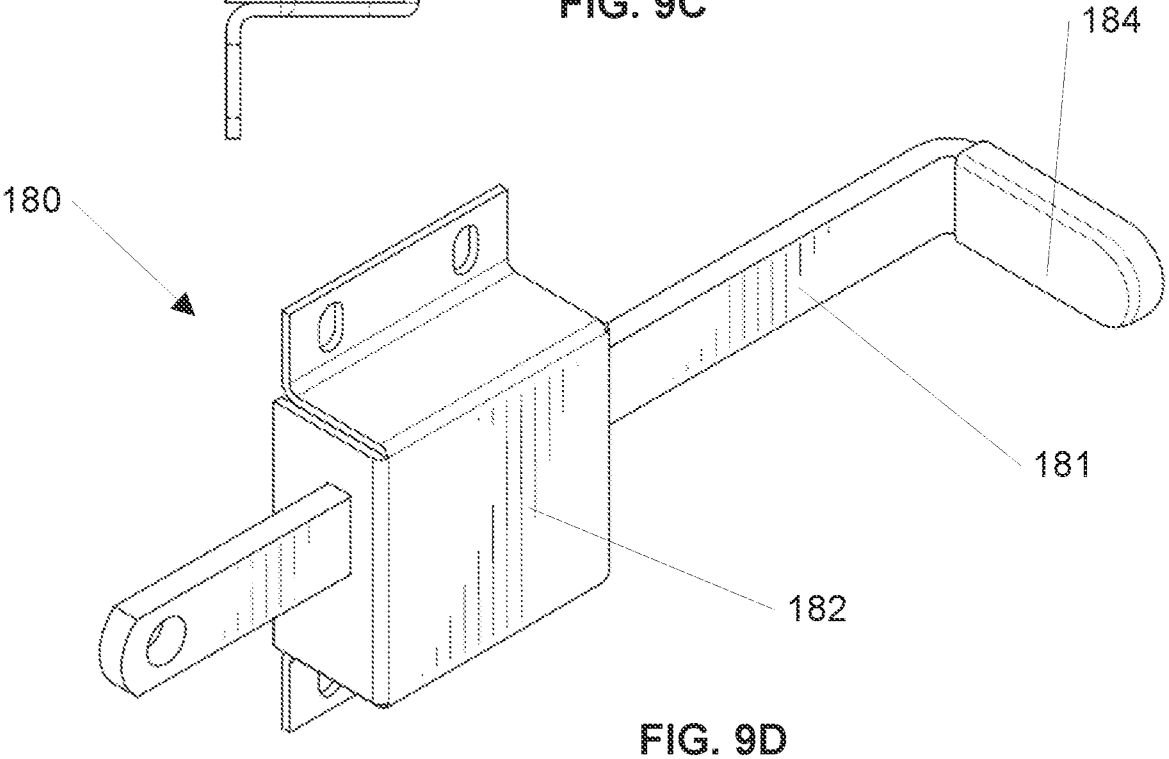

FIGS. 9A-9E illustrate an interior lock 180 that may be utilized with the dock door assembly 100 in accordance with aspects of the invention. FIG. 9A illustrates a front view of the interior lock 180 installed on the dock door 110. FIGS. 9B-9D illustrate various views of the interior lock 180. The interior lock 180 may be installed or utilized on the dock door 110 and one of the horizontal sections 111, 112, 113, 114, 115.

The interior lock 180 may include a slide bar 181 that extends through a lock cover 182. The slide bar 181 may slide within the lock cover 182 from an open (extended) position or closed/locked (compressed) position. The slide bar 181 may engage with a strike plate 185 installed on the vertical track 126 when the slide bar 181 is in the closed/locked and compressed position. The slide bar 181 and lock cover 182 may be connected by a spring 183 that provides bias to pull and/or pull the slide bar 181 from either the open (extended) position or closed/locked (compressed) position. The slide bar 181 may include a slide bar cover 184. The slide bar 181 may include a longer handle to help keep hands away from the door cable 162. The length of the slide bar 181 may be approximately nine inches long. Other lengths of the slide bar 181 may be utilized without departing from the invention. The longer handle for the slide bar 181 allows for a safer lock option where hands will not get in the way of the door cable 162.

Figure 9E:
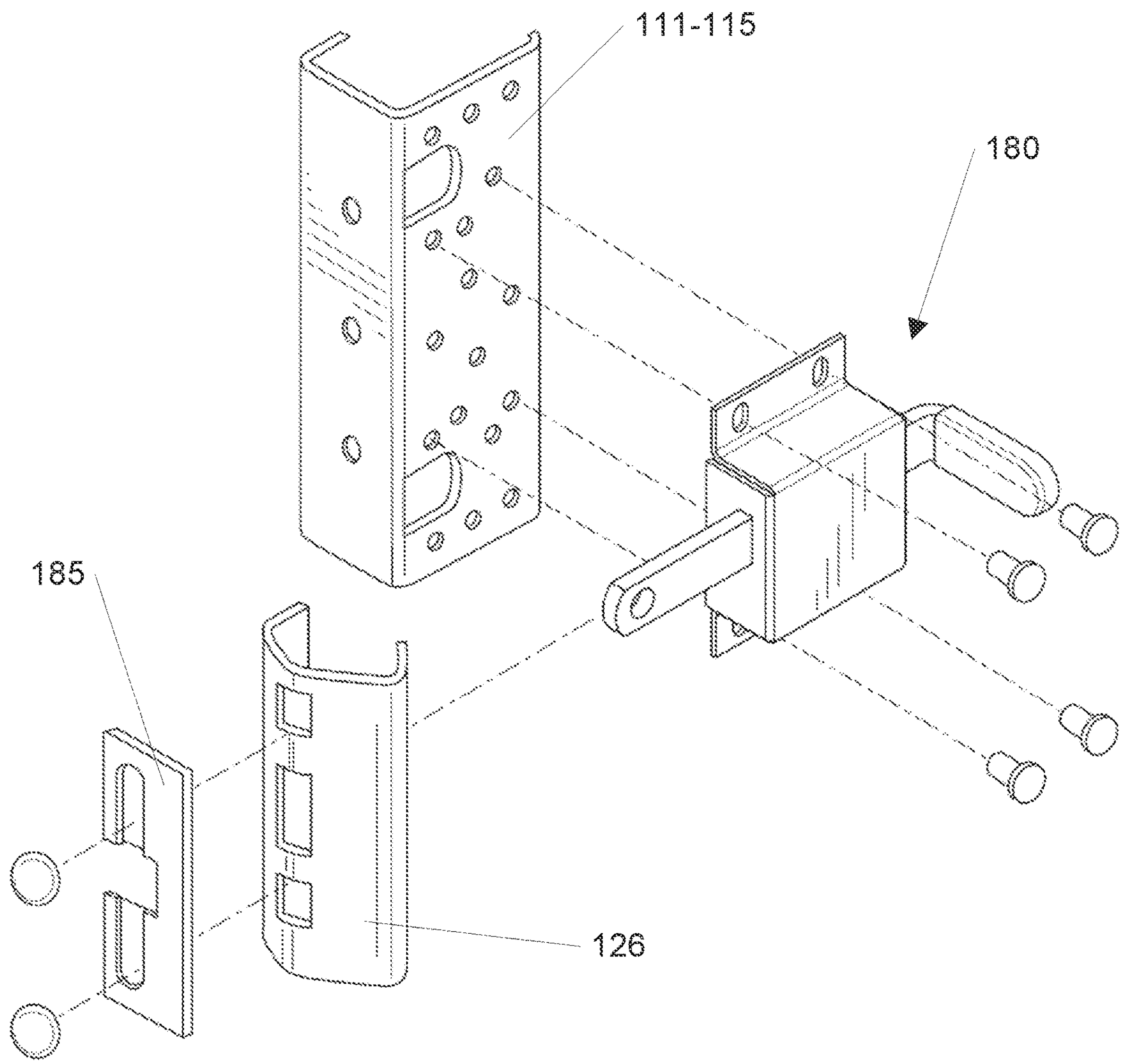
FIG. 9E is a component and installation view of the interior lock from the dock door assembly from FIG. 2A in accordance with aspects of the invention.

FIG. 9E illustrates a component and installation view of the interior lock 180 installed on a dock door 110. As illustrated in FIG. 9E, the interior lock 180 may be installed and attached to the dock door 110 or horizontal door sections 111, 112, 113, 114, 115 using and one or more fasteners. The strike plate 185 may be attached to or connected to the vertical track 126, track assembly 120, wall, or door jamb using one or more fasteners.

Figure 10A:
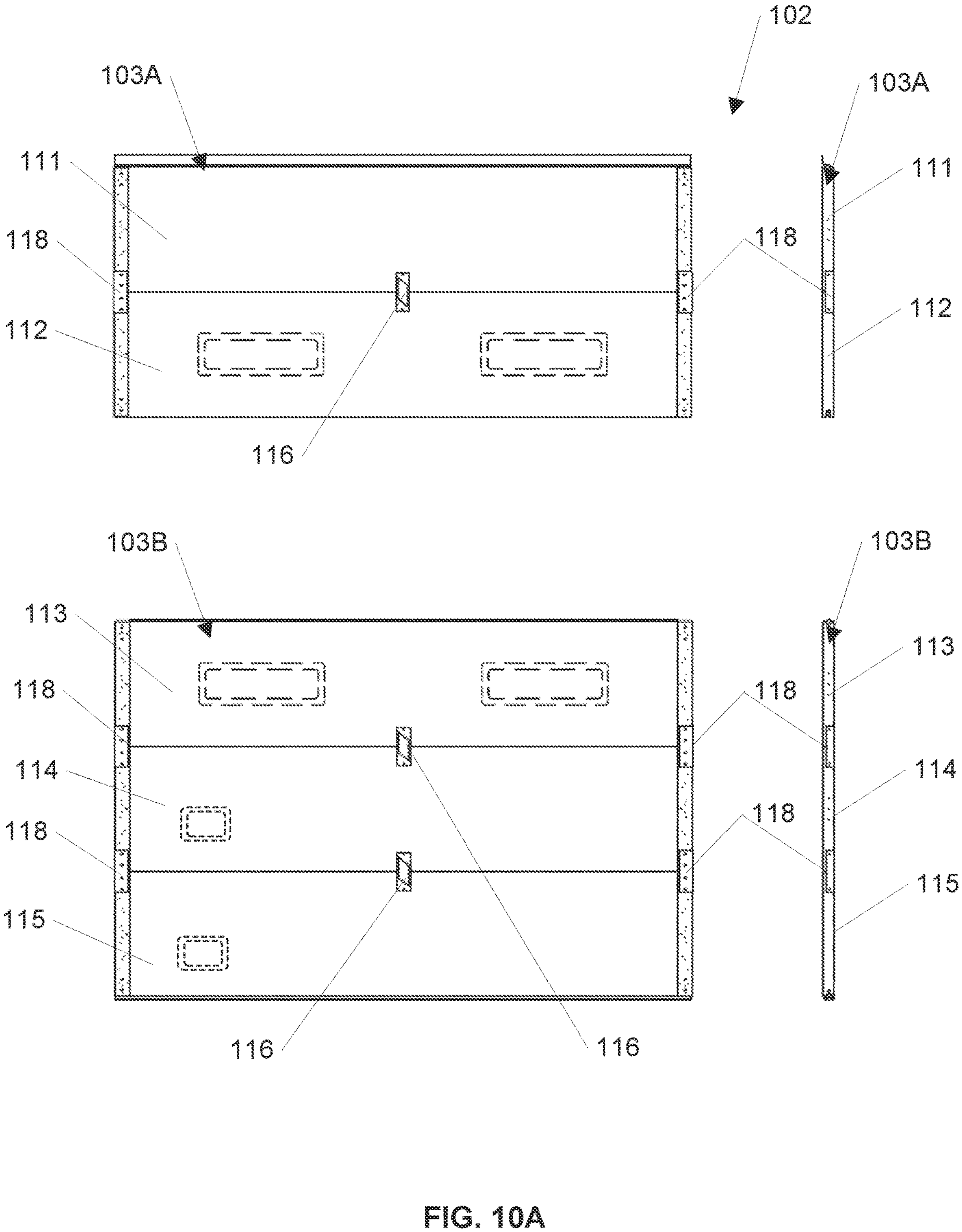
FIG. 10A is a front view of pre-assembled door panels from the dock door assembly from FIG. 2A in accordance with aspects of the invention.
Figure 10B:
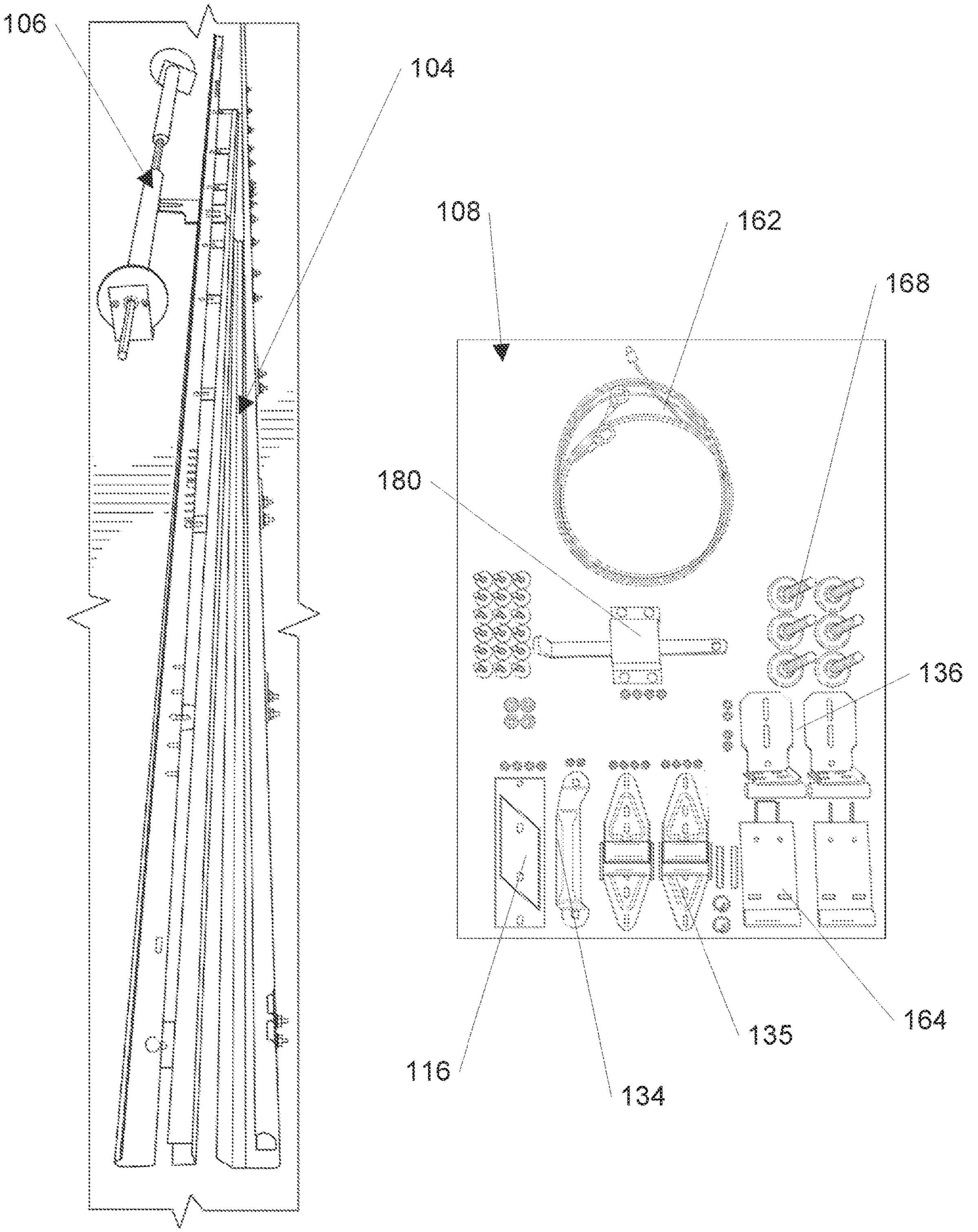
FIG. 10B are front perspective views of a pre-assembled track assembly, a pre-assembled spring shaft assembly, and a hardware carton for the dock door assembly from FIG. 2A in accordance with aspects of the invention.

FIGS. 10A and 10B illustrate a dock door assembly kit 101 to use minimal parts for assembly and installation, thus providing a fast and easy installation. The dock door assembly 100 and dock door assembly kits (as detailed and described in reference to FIGS. 10A and 10B) may be installed quicker than equivalent prior art versions. For example, prior art dock door installation takes approximately 60-75 minutes using two installers. The dock door assembly 100 and dock door assembly kit installation of the present invention may take approximately 30 minutes and even as low as 24 minutes using two installers. For example, FIGS. 10A and 10B illustrate the door dock assembly 100 with pre-assembled door panels 102; a pre-assembled track assembly 104; a pre-assembled spring shaft assembly 106; and a hardware carton 108. FIG. 10A illustrates both a front view and a side view of the pre-assembled door panels 102 of the door dock assembly 100. The pre-assembled door panels 102, as depicted in FIG. 10A, may include two door panels 103A, 103B with the various horizontal door sections 111, 112, 113, 114, 115 already cleated together. For example, the top door panel may be comprised of two horizontal sections 111, 112 pre-assembled together with one section center plate 116 and two section end cleats 118. The bottom door panel may be comprised of three horizontal sections 113, 114, 115 pre-assembled together with two section center plates 116 and four section end cleats 118. The pre-assembled joining of multiple horizontal door sections provides less sub-assembly components/parts (i.e. two pre-assembled panels versus five separate horizontal door sections) for dock door installations. The two door panels 103A, 103B may be pre-assembled together using the horizontal door sections 111, 112, 113, 114, 115 with the section center plates 116 and section end cleats 118 using one or more fasteners. Other combinations of numbers of horizontal door section pre-assembly for the various door panels may be provided without departing from this invention.

FIG. 10B illustrates the pre-assembled track assembly 104, the pre-assembled spring shaft assembly 106, and the hardware carton 108. The pre-assembled track assembly 104 may include the clip angle track, headplates, weather seal, and brackets all pre-assembled. The pre-assembled track assembly 104 may be configured to be attached to a wall. The pre-assembled track assembly 104 may include a pair of pre-assembled vertical tracks with each of the pre-assembled vertical tracks comprising a vertical roller track, a clip angle wall plate attached to the vertical roller track with a plurality of track clips, and a headplate having a U-shaped opening and attached to the clip angle wall plate and the vertical track. Each of the pre-assembled vertical tracks may be attached to opposing lateral sides of a door opening. The pre-assembled spring shaft assembly 106 may include the torsion shaft with the counterbalance torsion springs, torsion brackets, bearings, and drums set on the torsion shaft all pre-assembled. The hardware carton 108 may include the various other contents required for final installation of the door assembly 100. For example, the hardware carton 108 may include one or more of the following: the door cable 162, the interior lock 180, a door handle 134, one center plate 116, two edge hinge 135, two upper top fixtures 136, two corner cable brackets 164, six roller wheels 168, and various fasteners required to complete the installation. The hardware carton 108 may be pre-assembled and/or loaded on a pallet with each of the components attached to the pallet.

Figure 11B:
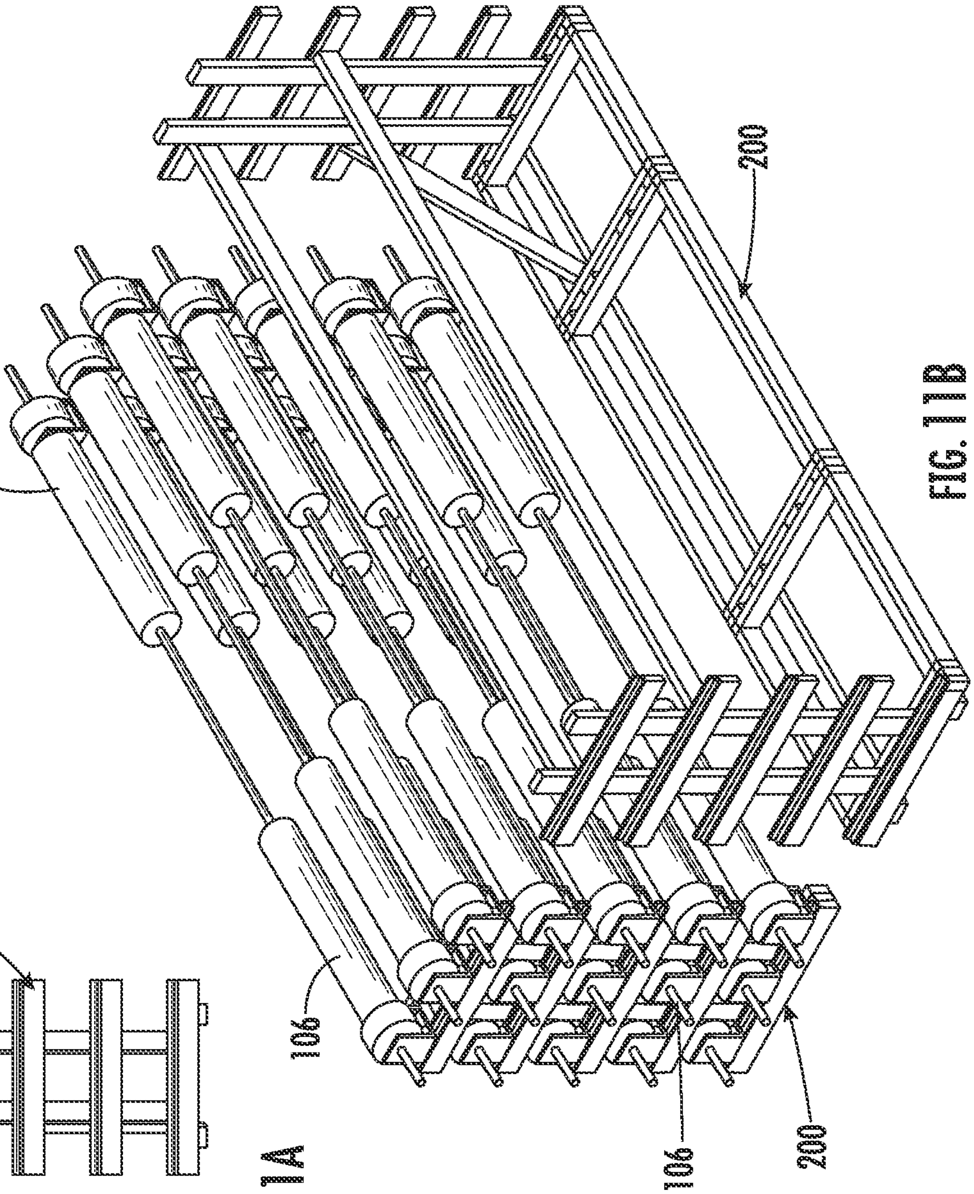
FIGS. 11A and 11B are various views of a racking to ship one or more pre-assembled spring shaft assemblies for the dock door assembly from FIG. 2A in accordance with aspects of the invention.
Figure 11A:
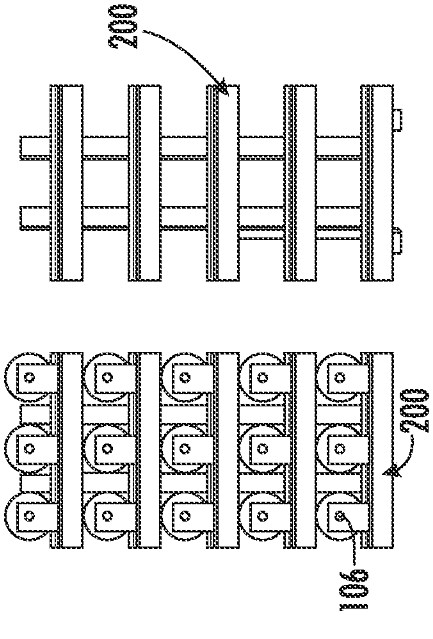
Figure 12:
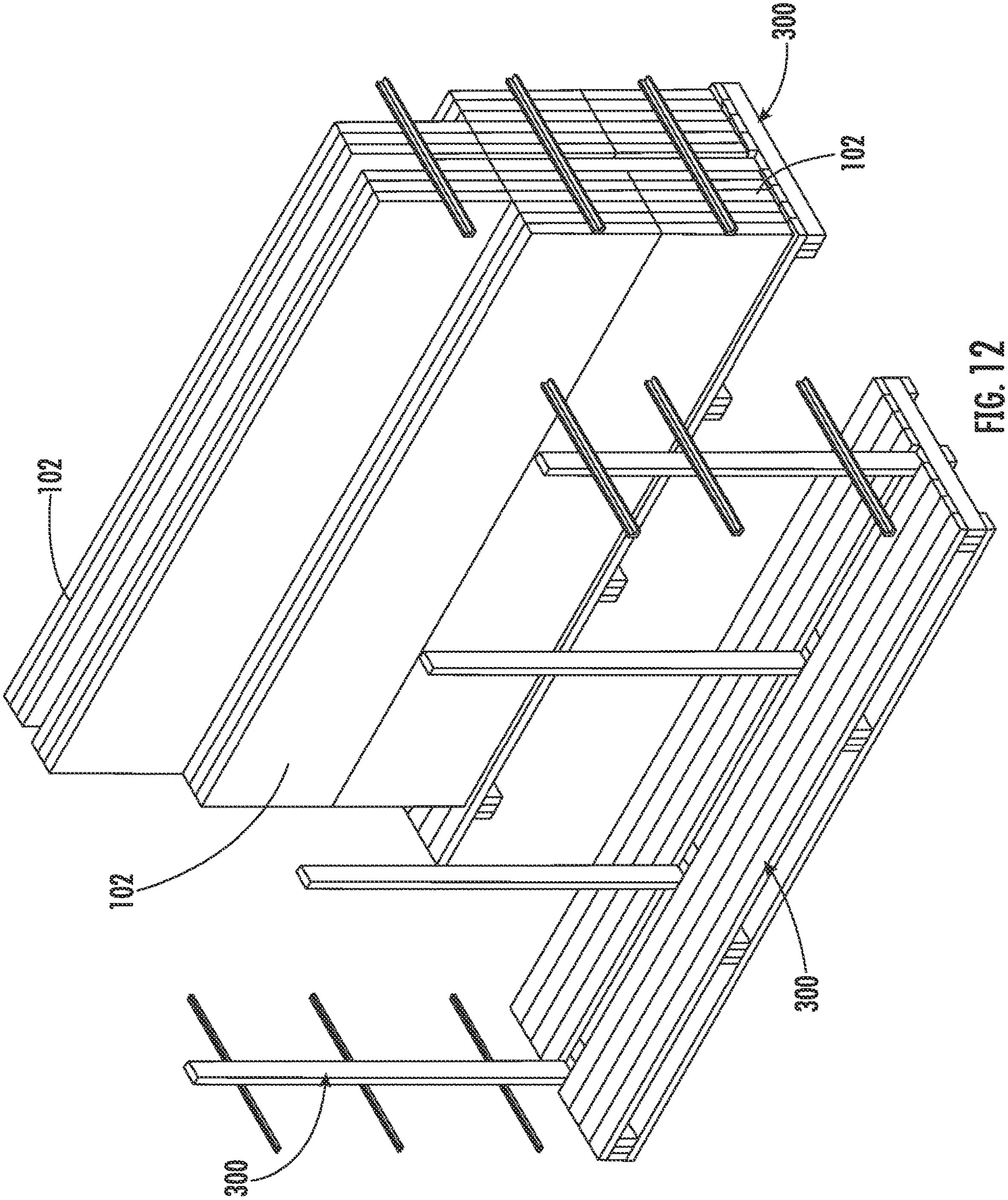
FIG. 12 is a perspective view of a racking to ship one or more pre-assembled door panels for the dock door assembly from FIG. 2A in accordance with aspects of the invention.

Additionally, as illustrated in FIGS. 11A, 11B, and 12, the pre-assembled door panels 102, the pre-assembled track assembly 104, the pre-assembled spring shaft assembly 106, and the hardware carton 108 may all be provided on specific racking to ship the pre-assembled portions of the door assembly 100 of the present invention. These racking are designed to protect the assemblies during shipment, maximize the amount of product on a truck, provide an easy method for unloading the truck with a forklift rather than by hand, and getting the parts easily to the door openings.

FIGS. 11A and 11B illustrate a racking 200 to ship a plurality of pre-assembled spring shaft assemblies 106. FIGS. 11A and 11B illustrate the racking 200 both empty and with the plurality of pre-assembled spring shaft assemblies 106 stacked within the racking 200. Various stacking configurations may be utilized for the plurality of pre-assembled spring shaft assemblies 106 within the racking 200.

FIG. 12 illustrates a racking 300 to ship the pre-assembled door panels 102. The racking 300 may hold any of the pre-assembled door panels 102, such as door panels 103A, 103B with the various horizontal door sections 111, 112, 113, 114, 115 already cleated together. The pre-assembled joining, packing, and shipping of multiple horizontal door sections provides less sub-assembly components/parts (i.e. two pre-assembled panels versus five separate horizontal door sections) for dock door installations. FIG. 12 illustrates the racking 300 both empty and with the pre-assembled door panels 102 stacked within the racking 300. Various stacking configurations may be utilized for the pre-assembled door panels 102 within the racking 300. The racking 300 may utilized perforated angles fastened to keep the pre-assembled door panels 102 upright. Additionally, the racking 300 may include spaces between the pre-assembled door panels 102 filled with bubble wrap or possibly cardboard. The racking 300 may include two perforated angle pieces per pre-assembled door panels stack that may be required to ensure the pre-assembled door panels 102 do not slant in a "zigzag" pattern. In a given method of installation of the dock door assembly kit, a dock door installation method may be defined various steps. In a first step, a left or right track assembly 104 may be installed on the wall and lateral side of the dock door opening. In a second step, the other of the left or right track assembly 104 may be installed on the opposing side of the wall and lateral side of the dock door opening. In a third step, the lower door panel 103B may be installed and stacked within the track assembly 104. The bottom half of the two edge hinges 135 may be attached to the top of the lower door panel 103B using one or more fasteners and two rollers 137 may be installed. The two corner cable brackets 164 may be attached at the bottom of the lower door panel 103B using one or more fasteners and two rollers 137 may be installed. In a fourth step, the upper door panel 103A may be installed and stacked above the lower door panel 103B within the track assembly 104 using a center plate 116. The top half of the two edge hinges 135 may be attached to the bottom of the upper door panel 103B using one or more fasteners. The top fixture 136 may be attached to the top of the upper door panel 103B using one or more fasteners and two rollers 137 may be installed. In a fifth step, the pre-assembled spring shaft assembly 106 may be installed adjacent and above a top of the door opening at approximately 16-½ inches above header height. In a sixth step, the other various components may be installed, such as: the door cable 162 and the two corner cable brackets 164, the door cleat 176 of the windload lock 170, the interior lock 180, a door handle 134, two edge hinges 135, two upper top fixtures 136, and the six roller wheels 168. The order of steps detailed above may be varied, and/or one or more steps may be omitted, and/or one or more steps may be added.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

While there has been set forth a preferred embodiment of the invention, it is to be understood that the invention is limited only by the following claims and equivalents thereof.

While the invention has been described with respect to specific examples and includes presently preferred modes of carrying out the invention, those skilled in the art will appreciate that there are numerous variations and permutations of the above described systems and techniques that fall within the spirit and scope of this disclosure.

What is claimed:

1. A dock door assembly for use in a dock door opening in a warehouse, the dock door assembly comprising:

a pair of vertical tracks, with each track configured to be attached to a wall along opposing lateral sides of the dock door opening, each vertical track comprising a vertical roller track and a clip angle wall plate to attach each vertical roller track to the wall;

a multiple, horizontal section door characterized by a vertical height when closed and mounted on the pair of vertical tracks, the door moveable on the vertical roller tracks between an open and a substantially vertical closed position, the door including a plurality of horizontal sections;

a spring shaft assembly located adjacent and above a top of the door opening at no greater than 40 inches above a header height, the spring shaft assembly including a torsion shaft, a pair of cable drums with each cable drum located at an end of the torsion shaft, at least one counterbalance torsion spring extending along the torsion shaft, and at least one torque bracket adjacent the at least one counterbalance torsion spring;

a pair of headplates with one headplate fastened to each of the clip angle wall plates and the vertical tracks, each headplate located at opposing lateral sides of the door opening, the headplate having a U-shaped opening to receive each end of the torsion shaft; and a pair of door cables and a pair of corner cable attachments connecting each door cable to each of the cable drums, the door cable having a first end attached to the cable drum and a second end attached to the corner cable attachment, wherein the corner cable attachment is located on an interior of the dock door and on a lowermost horizontal section of the dock door;

wherein two or more of the plurality of horizontal sections are fastened together by a section center plate, wherein the section center plate comprises a flat plate without a pivoting hinge.

2. The dock door assembly of claim 1, further including:

a windload lock that comprises a wall cleat and a door cleat that cooperatively engage and secure the dock door for windload resistance, the wall cleat attached to one of the clip angle wall plates and the door cleat attached to one of the horizontal sections.

3. The dock door assembly of claim 2, wherein the wall cleat comprises a wall cleat extension arm that extends from a wall cleat support plate attached to one of the clip angle wall plates and the door cleat comprises a door cleat extension arm that extends from a door cleat support plate attached to one of the horizontal sections, wherein the wall cleat extension arm and the door cleat extension arm cooperate and engage with each other to keep the dock door secure for windload resistance.

4. The dock door assembly of claim 1, further including:

an interior lock that comprises a slide bar attached to one of the horizontal sections, wherein the slide bar slides between an extended position and a compressed position, wherein when the slide bar is in the compressed position, the slide bar engages with a strike plate attached to the vertical track and locks the dock door in a closed position, wherein when the slide bar is in the extended position, the slide bar is disengaged with the strike plate and the dock door is unlocked.

5. The dock door assembly of claim 4, wherein the slide bar is approximately 9 inches long.

6. The dock door assembly of claim 1, wherein the plurality of horizontal sections includes four or five horizontal sections.

7. The dock door assembly of claim 1, wherein each of the headplates extends perpendicular to the wall and the U-shaped opening is angled upward to ensure the torsion shaft sets into the opening and remains in the opening, thereby allowing the spring shaft assembly to be front loaded and front mounted on the headplate and the pair of vertical tracks and wall.

8. The dock door assembly of claim 1 further comprising:

two outboard shaft support plates mounted to the wall to support the spring shaft assembly and the torsion shaft, wherein the outboard shaft support plates includes a wall bracket attached to the wall and a support arm extending perpendicularly from the wall bracket to receive and hold one or more of the ends of the torsion shaft, wherein the one or more outboard shaft support plates limit a deflection of the torsion shaft, with one outboard shaft support plate on each side of the headplate.

9. The dock door assembly of claim 1, wherein the corner cable attachment includes a tubular shape to hold a roller shaft of a roller wheel in the corner cable attachment, the roller wheel held in the vertical roller track, and wherein the corner cable attachment is located above the tubular member.

10. A dock door assembly for use in a dock door opening in a warehouse, the dock door assembly comprising:

a pair of vertical tracks, with each vertical track configured to be attached to a wall along opposing lateral sides of the dock door opening, each vertical track comprising a vertical roller track and a clip angle wall plate to attach each vertical roller track to the wall, wherein each clip angle wall plate is generally L-shaped;

a multiple, horizontal section door characterized by a vertical height when closed and mounted on the pair of vertical tracks, the door moveable on the vertical roller tracks between an open and a substantially vertical closed position, the door including a plurality of horizontal sections;

a spring shaft assembly located adjacent and above a top of the door opening at no greater than 40 inches above a header height, the spring shaft assembly including a torsion shaft, a pair of cable drums with each cable drum located at an end of the torsion shaft, at least one counterbalance torsion spring extending along the torsion shaft, and at least one torque bracket adjacent the at least one counterbalance torsion spring;

a pair of headplates, with one headplate fastened to each of the clip angle wall plates and the vertical tracks, each headplate located at opposing lateral sides of the door opening, the headplate having a U-shaped opening to receive each end of the torsion shaft;

a pair of door cables and a pair of corner cable attachments connecting each door cable to each of the cable drums, the door cable having a first end attached to the cable drum and a second end attached to the corner cable attachment, wherein the corner cable attachment is located on an interior of the dock door and on a lowermost horizontal section of the dock door;

a windload lock that comprises a wall cleat and a door cleat that cooperatively engage and secure the dock door for windload resistance, the wall cleat attached to one of the clip angle wall plates and the door cleat attached to one of the horizontal sections; and an interior lock that comprises a slide bar attached to one of the horizontal sections, wherein the slide bar slides between an extended position and a compressed position, wherein when the slide bar is in the compressed position, the slide bar engages with a strike plate attached to the vertical track and locks the dock door in a closed position, wherein when the slide bar is in the extended position, the slide bar is disengaged with the strike plate and the dock door is unlocked;

wherein two or more of the plurality of horizontal sections are fastened together by a section center plate, wherein the section center plate comprises a flat plate without a pivoting hinge.

11. The dock door assembly of claim 10, wherein the wall cleat comprises a wall cleat extension arm that extends from a wall cleat support plate attached to one of the clip angle wall plates and the door cleat comprises a door cleat extension arm that extends from a door cleat support plate attached to one of the horizontal sections, wherein the wall cleat extension arm and the door cleat extension arm cooperate and engage with each other to keep the dock door secure for windload resistance.

12. The dock door assembly of claim 10, wherein the slide bar is approximately 8 inches long.

13. The dock door assembly of claim 10, wherein the plurality of horizontal sections includes four or five horizontal sections.

14. The dock door assembly of claim 10, wherein each of the headplates extends perpendicular to the wall and the U-shaped opening is angled upward to ensure the torsion shaft sets into the opening and remains in the opening, thereby allowing the spring shaft assembly to be front loaded and front mounted on the headplate and the pair of vertical tracks and wall.

15. The dock door assembly of claim 10 further comprising: one or more outboard shaft support plates mounted to the wall to support the spring shaft assembly and the torsion shaft, wherein the one or more outboard shaft support plates includes a wall bracket attached to the wall and a support arm extending perpendicularly from the wall bracket to receive and hold one or more of the ends of the torsion shaft.

16. The dock door assembly of claim 10, wherein the corner cable attachment includes a tubular shape to hold a roller shaft of a roller wheel in the corner cable attachment, the roller wheel held in the vertical roller track.

17. A dock door assembly kit for installation and assembly in a dock door opening of a warehouse, the dock door assembly kit comprising:

a track assembly configured to be attached to a wall, the track assembly including a pair of pre-assembled vertical tracks with each of the pre-assembled vertical tracks comprising a vertical roller track, a clip angle wall plate attached to the vertical roller track with a plurality of track clips, and a headplate having a U-shaped opening and attached to the clip angle wall plate and the vertical track, wherein each of the pre-assembled vertical tracks are configured to attach to opposing lateral sides of a door opening;

a plurality of pre-assembled door panels, with each pre-assembled door panel comprising a plurality of horizontal door sections pre-assembled together with one or more section center plates and one or more section end cleats, wherein the plurality of pre-assembled door panels connected together define a multiple, horizontal section door characterized by a vertical height when closed and mounted on the track assembly, the door is configured to be moveable on the track assembly between an open and a substantially vertical closed position;

a spring shaft assembly, including a torsion shaft with pre-assembled components defined by a pair of cable drums with each cable drum located at an end of the torsion shaft, at least one counterbalance torsion spring extending along the torsion shaft, and at least one torque bracket adjacent the at least one counterbalance torsion spring, wherein the ends of the torsion shaft are configured to set in the U-shaped opening of the headplates; and a hardware carton comprising components required for final installation of the dock door assembly, wherein the components include one or more of the following: a door cable, an interior lock, door handle, the one or more section center plates, one or more edge hinges, two corner cable brackets, two top fixtures, a plurality of rollers, and a plurality of fasteners for the component installation;

wherein each section center plate comprises a flat plate without a pivoting hinge, and each section center plate fastens two or more the plurality of horizontal door sections together.

18. The dock door assembly kit of claim 17, wherein the plurality of pre-assembled door panels includes a top door panel and a bottom door panel, with the top door panel comprised of two horizontal sections pre-assembled together with one section center plate and two section end cleats and the bottom door panel comprised of two or three horizontal sections pre-assembled together with one or two section center plates and two or four section end cleats.

19. The dock door assembly kit of claim 17, wherein the U-shaped opening of each of the headplates is angled upward to ensure the torsion shaft sets into the opening and remains in the opening, thereby allowing the spring shaft assembly to be front loaded and front mounted on the headplate and the track assembly and wall.

20. The dock door assembly kit of claim 17, wherein the hardware carton includes one or more outboard shaft support plates configured to be mounted to the wall to support the spring shaft assembly and the torsion shaft, wherein the one or more outboard shaft support plates includes a wall bracket configured to be attached to the wall and a support arm extending perpendicularly from the wall bracket configured to receive and hold one or more of the ends of the torsion shaft.

* * * * *